US012797659B2

(12) United States Patent
Foley et al.

(10) Patent No.: US 12,797,659 B2
(45) Date of Patent: Nov. 17, 2026

(54) COMMON ATTACHMENT INTERFACE FOR A FIREFIGHTING ROBOTIC VEHICLE

(71) Applicant: Howe & Howe Inc., Waterboro, ME (US)

(72) Inventors: Timothy Merlin Foley, Lyman, ME (US); Jesse Morrill, Standish, ME (US); Matthew Gregory Williams, Kennebunk, ME (US); Ronald Louis Lemons, Richmond, ME (US)

(73) Assignee: Howe & Howe Inc., Waterboro, ME (US)

( * ) Notice: Subject to any disclaimer, the term of this patent is extended or adjusted under 35 U.S.C. 154(b) by 170 days.

(21) Appl. No.: 18/794,250

(22) Filed: Aug. 5, 2024

(65) Prior Publication Data

US 2025/0050149 A1 Feb. 13, 2025

Related U.S. Application Data

(60) Provisional application No. 63/600,796, filed on Nov. 20, 2023, provisional application No. 63/531,382, filed on Aug. 8, 2023.

(51) Int. Cl.
*A62C 27/00* (2006.01)
*B62D 49/02* (2006.01)
(Continued)

(52) U.S. Cl.
CPC ................ *A62C 27/00* (2013.01); *B66F 9/18* (2013.01); *F16G 15/06* (2013.01)

(58) Field of Classification Search
CPC .............. A62C 27/00; B66F 9/00; B66F 9/06; B66F 9/075; B66F 9/12; B66F 9/18; F16F 15/00; F16F 15/04; F16F 15/06
(Continued)

(56) References Cited

U.S. PATENT DOCUMENTS 4,403,432 A * 9/1983 Biance .................... E01H 5/068 172/445.2
5,593,270 A 1/1997 Richards
8,103,418 B2 1/2012 Osswald et al.
(Continued)

FOREIGN PATENT DOCUMENTS

CN 112972941 6/2021
KR 102083894 B1 * 3/2020 ............. A62C 27/00
WO 2022265660 12/2022

OTHER PUBLICATIONS

Firefighting Robot TAF35. Datasheet [online]. Emicontrols, 2021. [Retrieved on Mar. 18, 2026]. Retrieved from the internet: <https://web.archive.org/web/20210728103926/https://www.emicontrols.com/en/fire-fighting/mobile-fire-protection/firefighting-robot-taf35>. (Year: 2021).*

(Continued)

*Primary Examiner* — Daniel M. Keck
(74) *Attorney, Agent, or Firm* — BainwoodHuang

(57) ABSTRACT

A firefighting robotic vehicle includes firefighting equipment, a vehicle body constructed and arranged to support the firefighting equipment, and a frontend attachment that couples with the vehicle body. The frontend attachment includes a mount assembly constructed and arranged to attach to the vehicle body, a head assembly constructed and arranged to serve as a frontend of the firefighting robotic vehicle, and pin hardware constructed and arranged to selectively lock the head assembly to the mount assembly and unlock the head assembly from the mount assembly. Example heads for the head assembly include a plow, a forklift, combinations thereof, etc.

20 Claims, 19 Drawing Sheets

(51) Int. Cl.

| | |
|---|---|
| ***B62D 49/04*** | (2006.01) |
| ***B62D 55/06*** | (2006.01) |
| ***B66F 9/18*** | (2006.01) |
| ***F16G 15/06*** | (2006.01) |

(58) Field of Classification Search

USPC .......................................................... 280/727

See application file for complete search history.

(56) References Cited

U.S. PATENT DOCUMENTS

| | | | | |
|---|---|---|---|---|
| 2002/0175492 | A1 | 11/2002 | Ornum | |
| 2009/0120273 | A1* | 5/2009 | Eckdahl | F41H 7/02 89/1.1 |
| 2012/0086192 | A1* | 4/2012 | Kimener | B60S 9/02 280/763.1 |
| 2014/0091554 | A1* | 4/2014 | Columbia | B60D 1/07 280/504 |
| 2014/0327223 | A1* | 11/2014 | Dilts | A01D 41/1261 280/166 |
| 2019/0291669 | A1* | 9/2019 | Pavlik | B60R 19/56 |
| 2022/0347835 | A1 | 11/2022 | Majetic | |
| 2023/0167618 | A1 | 6/2023 | Mattson | |
| 2023/0406639 | A1 | 12/2023 | Brett | |
| 2024/0140151 | A1* | 5/2024 | Bowe | B60D 1/06 |
| 2025/0288837 | A1* | 9/2025 | Martens | A62C 3/0207 |
| 2025/0332459 | A1* | 10/2025 | Gschnitzer | A62C 31/24 |
| 2026/0117571 | A1* | 4/2026 | Parsons | E05D 5/10 |

OTHER PUBLICATIONS

International Search Report and Written Opinion for application No. PCT/US2024/041237, dated Nov. 8, 2024, 18 pages.

Cantonati, Dominik; "https://www.emicontrols.com/en/fire-fighting/mobile-fire-protection/firefighting-robot-taf35", retrieved from the internet Nov. 7, 2024.

* cited by examiner

COMMON ATTACHMENT INTERFACE FOR A FIREFIGHTING ROBOTIC VEHICLE

CROSS REFERENCE TO RELATED APPLICATIONS

This application is a regular utility application based on earlier-filed U.S. Application No. 63/531,382 filed on Aug. 8, 2023, entitled "Plow-Forklift Attachment for Tracked Vehicle", the contents and teachings of which are hereby incorporated by reference in their entirety.

Additionally, this application is a regular utility application based on earlier-filed U.S. Application No. 63/600,796 filed on Nov. 20, 2023, entitled "Quick-Attach Adapter for Firefighting Vehicle", the contents and teachings of which are hereby incorporated by reference in their entirety.

BACKGROUND

Firefighting robotic vehicles have been used in dangerous situations to assist human firefighters in extinguishing and preventing the spread of fires. Such robots can enter hot, smoke-filled areas, even when open flames are present, and can direct large amounts of water at burning objects at very high speed.

Firefighting robots are sometimes equipped with plows. Such plows can attach to the fronts of firefighting robots to clear paths and move burning objects out of the way of personnel and equipment.

SUMMARY

Sometimes, it is necessary to swap a plow on a firefighting robotic vehicle for some other attachment apparatus, such as a different type of plow, pallet forks, or some other equipment. Prior approaches to swapping attachments may involve removing one attachment apparatus completely from the firefighting robotic vehicle and then attaching another attachment apparatus to the firefighting robotic vehicle in its place.

Unfortunately, changeovers in such equipment can be time consuming and labor intensive. They can sometimes require access to the bottom of the vehicle, which can require lifts or specialized tools. They can also involve many parts, as each attachment apparatus has its own components, which are independent from components of other attachment apparatus. A consequence of this independence is that it is not practical for the owner or operator of the firefighting robotic vehicle to perform a changeover during a fire event. Alternatively, if a changeover must be performed during a fire event, the owner or operator must generally store multiple large apparatus on site and may need to transport such large apparatus to the location of the fire when the vehicle is being used. What is needed, therefore, is a way of changing equipment attached to a firefighting robotic vehicle that requires less effort and involves fewer parts.

The above need is addressed at least in part by an improved technique for changing attachments used with a firefighting robotic vehicle. The technique includes providing a mount assembly that attaches to the firefighting robotic vehicle. The mount assembly includes a common interface constructed and arranged to receive multiple interchangeable head assemblies. The head assemblies can include various types of plow heads, pallet forks, or other equipment (such as a combination plow-pallet fork attachment described in further detail below). In some arrangements, the common interface of the mount assembly includes an upper catch and a lower fixation point. Each head may include an upper hook adapted to engage the upper catch of the common interface. Each head may further include a lower fixation point arranged to intersect the lower fixation point of the common interface when the head is oriented in alignment for operation to enable quick locking via a set of pins.

Advantageously, the improved technique allows different heads to be used with the same common interface, greatly reducing the total amount of equipment that must be stored and transported to the site of a fire. As the common interface can remain in place, the amount of time and labor required to change one head to another is typically much less than what would be needed if entire assemblies were switched.

One embodiment is directed to a firefighting robotic vehicle which includes firefighting equipment. The firefighting robotic vehicle further includes a vehicle body constructed and arranged to support the firefighting equipment. The firefighting robotic vehicle further includes a frontend attachment that couples with the vehicle body. The frontend attachment includes a mount assembly constructed and arranged to attach to the vehicle body, a head assembly constructed and arranged to serve as a frontend of the firefighting robotic vehicle, and pin hardware constructed and arranged to selectively lock the head assembly to the mount assembly and unlock the head assembly from the mount assembly.

Another embodiment is directed to a frontend attachment for a firefighting robotic vehicle. The frontend attachment includes:

- (A) a mount assembly constructed and arranged to attach to a vehicle body of the firefighting robotic vehicle;
- (B) a head assembly constructed and arranged to serve as a frontend of the firefighting robotic vehicle; and
- (C) pin hardware constructed and arranged to selectively lock the head assembly to the mount assembly and unlock the head assembly from the mount assembly.

Yet another embodiment is directed to a method of operating a firefighting robotic vehicle. The method includes:

- (A) fastening a mount assembly to a vehicle body of the firefighting robotic vehicle;
- (B) locking a first head assembly to the mount assembly using pin hardware, the first head assembly being constructed and arranged to serve as a first frontend of the firefighting robotic vehicle; and
- (C) after the first head assembly serves as the first frontend of the firefighting robotic vehicle, replacing the first head assembly with a second head assembly using the pin hardware to unlock the first head assembly from the mount assembly and then lock the second head assembly to the mount assembly.

In some arrangements, the mount assembly of the frontend attachment includes:

- (i) a base constructed and arranged to attach to an underside of the vehicle body; and
- (ii) a mounting interface coupled with the base, the mounting interface being constructed and arranged to interface with the head assembly.

In some arrangements, the head assembly of the frontend attachment includes a head, and a set of mounting portions coupled with the head. The set of mounting portions is constructed and arranged to align with the mounting interface of the mount assembly to enable the pin hardware to lock the head assembly to the mount assembly.

In some arrangements, the mounting interface of the mount assembly includes interface plates defining interface plate holes. Additionally, the set of mounting portions of the head assembly includes mounting plates defining mounting plate holes to align with the interface plate holes defined by the interface plates.

In some arrangements, the pin hardware of the frontend attachment includes clevis pins constructed and arranged to insert through the mounting plate holes and the interface plate holes and transfer at least a portion of a load from the head assembly to the mount assembly.

In some arrangements, the pin hardware further includes cotter pins constructed and arranged to insert through the clevis pins to retain the clevis pins within the mounting plate holes and the interface plate holes.

In some arrangements, the set of mounting portions of the head assembly includes hook portions coupled with the head. The hook portions are constructed and arranged to align with the mounting interface of the mount assembly to enable the head assembly to engage with the mount assembly.

In some arrangements, the pin hardware includes pin segments constructed and arranged to extend from the mounting interface of the mount assembly to enable catching of the hook portions and transfer at least a portion of a load from the head assembly to the mount assembly.

In some arrangements, the pin segments are clevis pins. Additionally, the pin hardware further includes cotter pins constructed and arranged to insert through the clevis pins to retain the clevis pins on the mounting interface of the mount assembly.

In some arrangements, the mount interface includes a set of bar members constructed and arranged to catch the hook portions and transfer at least a portion of a load from the head assembly to the mount assembly.

In some arrangements, the hook portions include a pair of hooks. Additionally, the set of bar members includes a crossbar constructed and arranged to extend across the pair of hooks and concurrently catch the pair of hooks.

In some arrangements, the head includes a set of forklift sections constructed and arranged to transport palletized materials during firefighting robotic vehicle operation.

In some arrangements, the head further includes a set of shackle members coupled with the set of forklift sections to enable the palletized materials to be restrained during transport.

In some arrangements, the head further includes a plow section coupled with the set of forklift sections. The set of forklift sections is constructed and arranged to pivot between a stowed position and a deployed position relative to the plow section.

In some arrangements, the firefighting robotic vehicle further includes a left track disposed on a left side of the vehicle body and a right track disposed on a right side of the vehicle body to enable the firefighting robotic vehicle to traverse varying terrains. Additionally, the base of the frontend attachment includes a plate which fastens to the underside of the vehicle body between the left track and the right track.

In some arrangements, the frontend attachment further includes a set of actuators coupled with the mounting interface and with the vehicle body to move the head assembly relative to the vehicle body.

Other embodiments are directed to systems, sub-systems, apparatus, assemblies, componentry, and so on. Some embodiments are directed to various methods, devices, platforms, etc. which are involved in operating a firefighting robotic vehicle.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Improved techniques are directed to changing attachments used with a firefighting robotic vehicle. Such techniques involve providing a mount assembly that attaches to the firefighting robotic vehicle. The mount assembly includes a common interface constructed and arranged to receive multiple interchangeable head assemblies. The head assemblies can include various types of plow heads, pallet forks, or other equipment (such as a plow-pallet fork attachment described in further detail below). In some arrangements, the common interface of the mount assembly includes an upper catch and a lower fixation point. Each head may include an upper hook adapted to engage the upper catch of the common interface. Each head may further include a lower fixation point arranged to intersect the lower fixation point of the common interface when the head is oriented in alignment for operation.

Advantageously, the improved technique allows different heads to be used with the same common interface, greatly reducing the total amount of equipment that must be stored and transported to the site of a fire. As the common interface can remain in place, the amount of time and labor required to change one head to another is typically much less than what would be needed if entire assemblies were switched.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
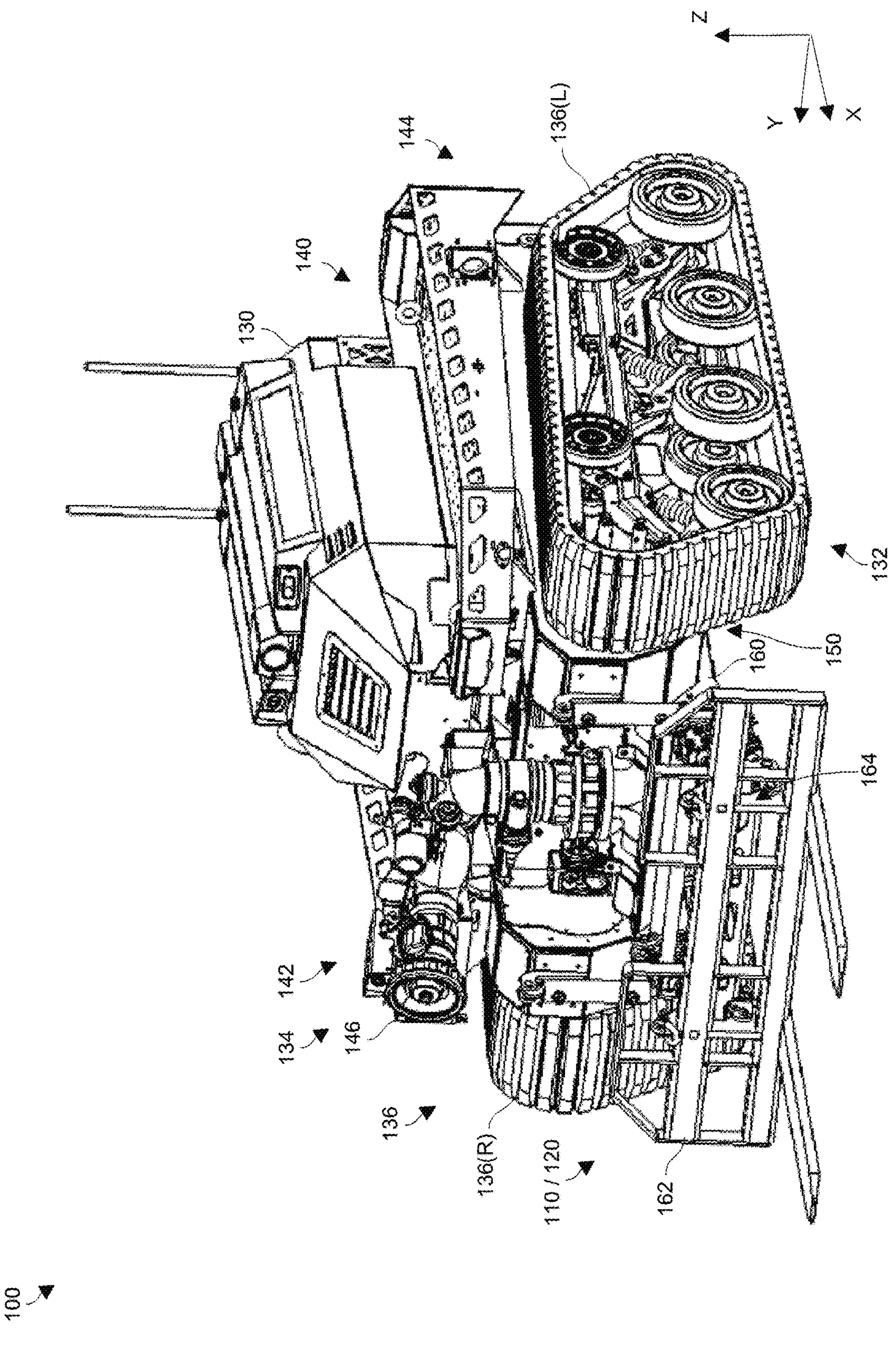
FIG. 1 is a perspective view of a firefighting robotic vehicle equipped with a frontend attachment having a first example head in accordance with certain embodiments.
Figure 2:
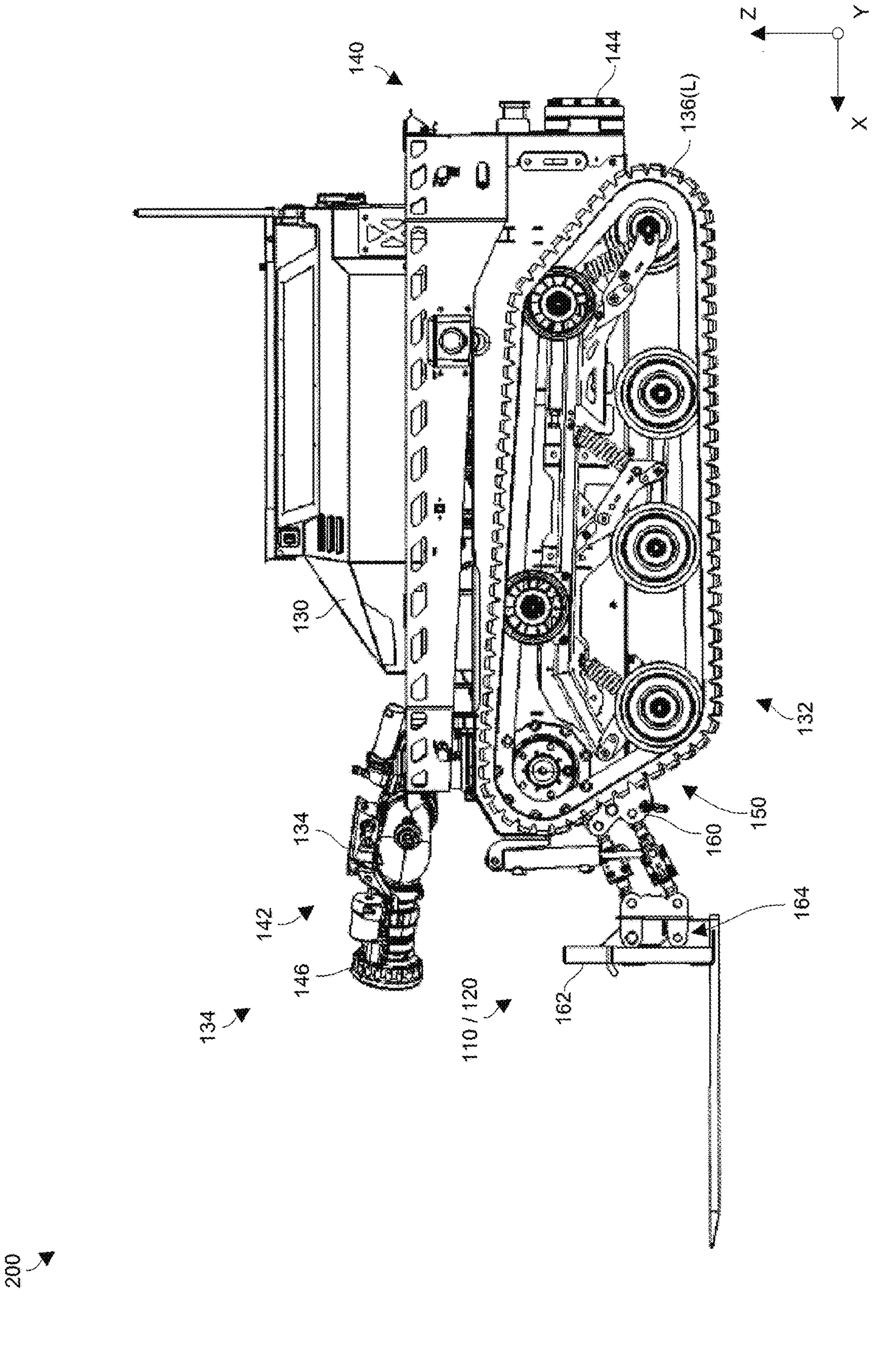
FIG. 2 is a side view of the firefighting robotic vehicle equipped with the frontend attachment having the first example head in accordance with certain embodiments.

FIGS. 1 and 2 show a firefighting robotic vehicle 100 equipped with a frontend attachment 110 having an example head 120 in accordance with certain embodiments. FIG. 1 is a perspective view of the firefighting robotic vehicle 100. FIG. 2 is a side view of the firefighting robotic vehicle 100.

The firefighting robotic vehicle 100 is constructed and arranged to connect with a set of fluid sources (e.g., by connecting with one or more hoses leading to the set of fluid sources), move over a ground surface based on remote commands (e.g., in response to wireless signals from a base station), and deploy fluid from the set of fluid sources toward a target (e.g., spray the fluid onto a burning structure). Such a firefighting robotic vehicle 100 has the ability to withstand environments that are too hazardous for human personnel.

As shown in FIGS. 1 and 2, the firefighting robotic vehicle 100 includes, in addition to the frontend attachment 110 having the example head 120, a vehicle body 130, a set of ground engaging members 132, and firefighting equipment 134.

The vehicle body 130 is constructed and arranged to operate the set of ground engaging members 132 to maneuver the firefighting robotic vehicle 100 over a ground surface. In some arrangements, the set of ground engaging members 132 includes a left track 136(L) and a right track 136(R) (collectively, tracks 136) which are driven by a set of wheels and motors (or engines) to enable the vehicle 100 to easily traverse a variety of different terrains which may be smooth, rough, hilly, uneven, irregular, etc. (e.g., roads, fields, sand, hills, ditches, rocky areas, uneven slopes, outcrops, creeks, marshes, combinations thereof, and so on).

The vehicle body 130 is constructed and arranged to support the firefighting equipment 134. In some embodiments, the firefighting equipment 134 includes a set of fluid conduits, such as one or more pipes (e.g., a single conduit or multiple conduits which may be stacked vertically and/or arranged side-by-side), running from a rear 140 of the vehicle body 130 to a front 142 of the vehicle body 130. The firefighting equipment 134 may further include a set of fluid couplings 144 at the rear 140 of the vehicle body 130 allowing for attachment of hoses or the like for delivering firefighting fluid, such as water, gel, or foam, to the set of conduits from an environment outside of the vehicle 100. Additionally, the firefighting equipment 134 may include a monitor 146 at the front 142 of the vehicle body 130 to receive the firefighting fluid conducted through the set of conduits 144 and emit the firefighting fluid toward desired locations in the environment.

It should be understood that the vehicle body 130 and/or the firefighting equipment 134 may provide certain other features such as a deck section which serves as a platform for performing various operations such as supporting specialized sensing equipment, carrying a tank that holds foam concentrate (e.g., for mixing with water before spraying), supporting a fan, supporting an array of lights and/or other equipment, carrying cargo, combinations thereof, etc.

The frontend attachment 110 is constructed and arranged couple with an underside 150 of the vehicle body 130. Along these lines, the frontend attachment 110 includes a mount assembly 160, a head assembly 162, and pin hardware 164.

The mount assembly 160 is constructed and arranged to attach to the underside 150 of the vehicle body 130 (e.g., to a portion of the suspension, the chassis, the frame, etc.). In accordance with certain embodiments, the mount assembly 160 is richly and reliably fastened to the underside 150 (e.g., via bolts) and is infrequently removed from the vehicle body 130 if at all after installation.

The head assembly 162 is constructed and arranged to serve as a frontend of the firefighting robotic vehicle 100. Along these lines, the head assembly 162 may have a configuration for a specific set of purposes (e.g., plowing, lifting, combinations thereof, etc.) that is separate and distinct from the firefighting equipment 134. In accordance with certain embodiments, the head assembly 162 is richly and reliably coupled with the mount assembly 160, but is easily and quickly removable to enable the head assembly 162 to be replaced with another head assembly 162 (e.g., changeable in the field during a fire event).

The pin hardware 164 is constructed and arranged to selectively lock the head assembly 162 to the mount assembly 160 and unlock the head assembly 162 from the mount assembly 160. In some embodiments, the pin hardware 164 includes clevis pins that insert through holes in the head assembly 162 and the mount assembly 160.

As will be described in further detail shortly, the frontend attachment 110 is constructed and arranged to perform useful work. Along these lines, when the frontend attachment 110 includes pallet forked head, the frontend attachment 110 enables the firefighting robotic vehicle 100 to engage and move palletized (or pallet-style) materials (e.g., lift and transfer the materials) while under remote control. Such maneuvering may occur while the firefighting robotic vehicle 100 concurrently utilizes the firefighting equipment 134 (e.g., sprays water on a burning surface or in directions to shield the materials from heat/fire/etc.) and/or occur interchangeably between times dedicated to utilizing the firefighting equipment 134. Further details will now be provided with reference to FIGS. 3 through 5.

Figure 3:
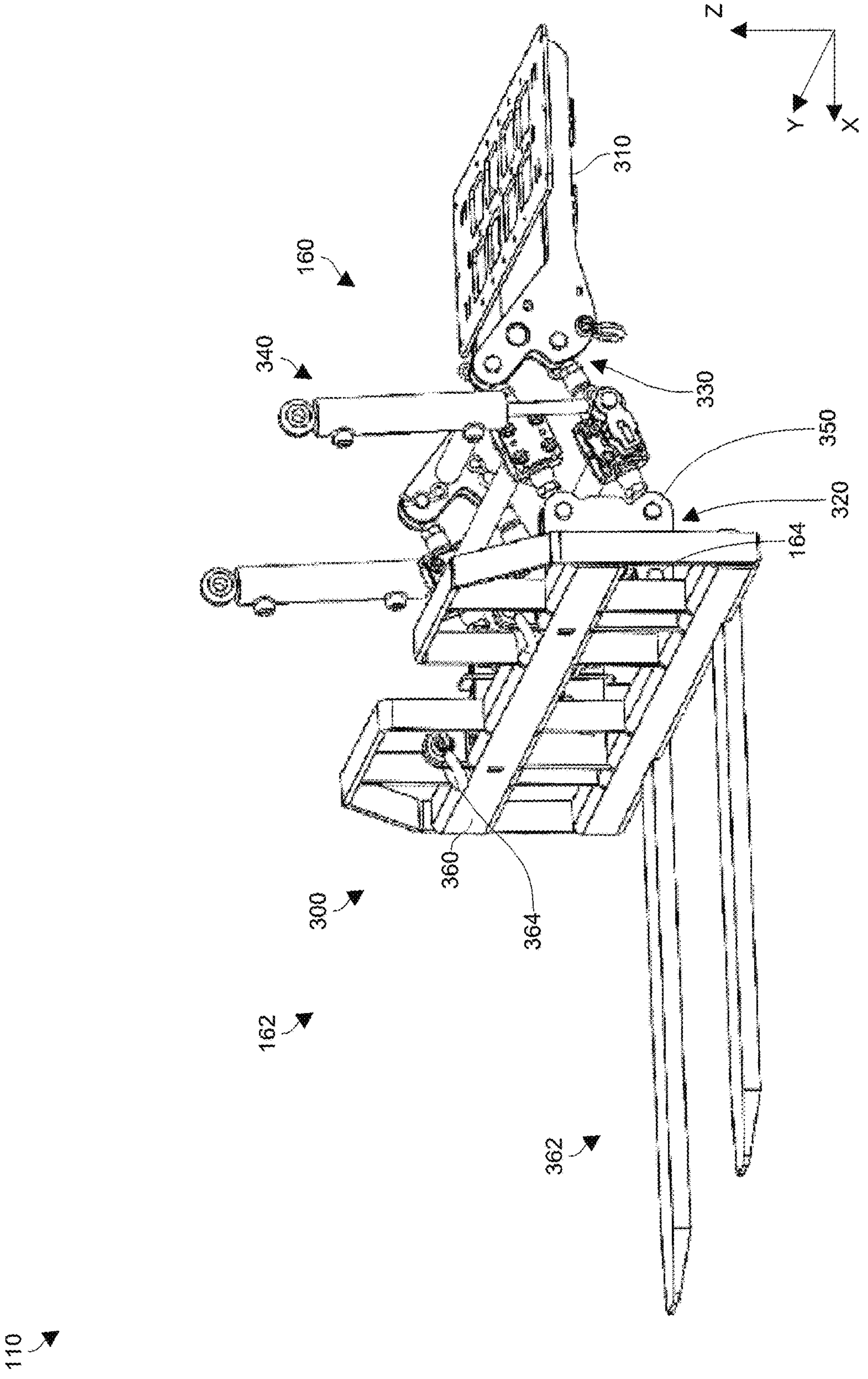
FIG. 3 is a perspective view of the frontend attachment having the first example head in a lowered state in accordance with certain embodiments.
Figure 4:
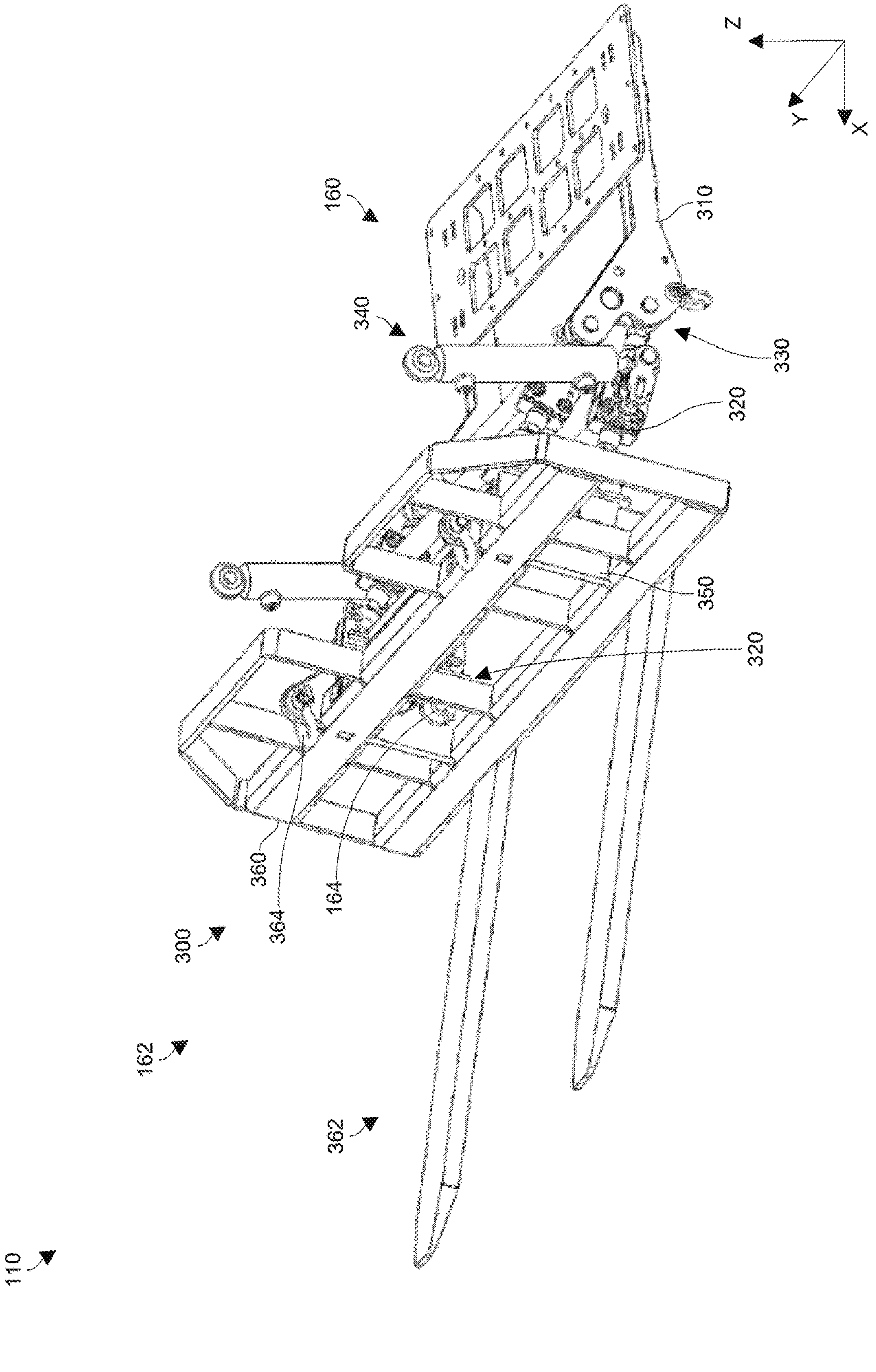
FIG. 4 is a perspective view of the frontend attachment having the first example head in a raised state in accordance with certain embodiments.
Figure 5:
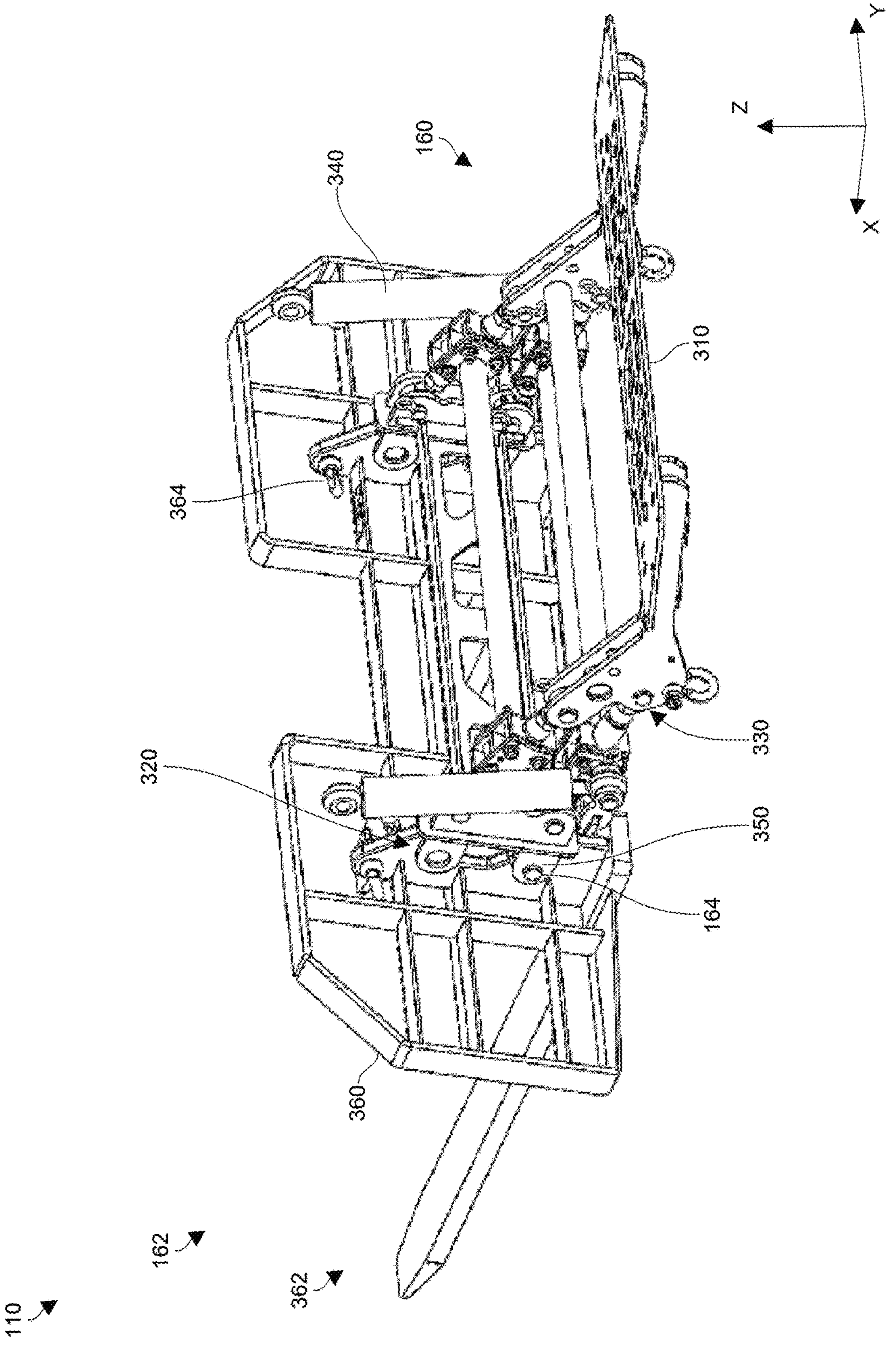
FIG. 5 is another perspective view of the frontend attachment having the first example head in the raised state in accordance with certain embodiments.

FIGS. 3 through 5 show views of the frontend attachment 110 having, as at least part of the head assembly 162, a first example head 300 in accordance with certain embodiments. FIG. 3 shows the first example head 300 in a lowered state relative to the mount assembly 160 of the frontend attachment 110. FIG. 4 shows the first example head 300 in a raised (or lifted) state relative to the mount assembly 160 of the frontend attachment 110. FIG. 5 shows the first example head 300 in the raised state from a different angle.

As shown in FIGS. 3 through 5, the mount assembly 160 of the frontend attachment 110 includes a base 310 and a mounting interface 320 coupled with the base 310. Along these lines, the mounting interface 320 is capable of pivoting relative to the base 310 at a pivot point 330. In some arrangements, the mounting interface 320 has a compound hinge assembly which provides multiple pivot points (e.g., one pivot point to raise/lower the head 300, and another pivot point to keep the head 300 level or only slightly pitched).

Moreover, actuators 340 are able to move the mounting interface 320 relative to the base 310 (e.g., selectively low and raise the mounting interface 320) under robotic control. Along these lines, first actuator ends attach to the mounting interface 320 and second actuator ends attach to the vehicle body 130 (also see FIGS. 1 and 2). Suitable mechanisms for the set of actuators 340 include hydraulic actuators, motorized actuators, combinations thereof, and so on.

In the context of hydraulic cylinders (or actuators), brackets (e.g., left and right) may connect the tops of the hydraulic cylinders to the vehicle body 130. Additionally, joiners may connect fore-link arms to cross braces, e.g., where bottom joiners connect to shafts of hydraulic cylinders for lifting and lowering head 300.

The base 310 may have a plate-shaped section that mounts flush with the underside 150 of the vehicle body 130 of the firefighting robotic vehicle 100 (e.g., a push plate that mounts to the vehicle bottom via bolts). The plate-shaped section enables the frontend attachment 110 to richly and reliably mount to the vehicle body 130 while still providing clearance (e.g., to clear debris, terrain imperfections, etc.) and durability (e.g., strength, rigidity, etc.).

The mounting interface 320 is constructed and arranged to couple with the head assembly 162. Along these lines and as will be explained in further detail shortly, the mounting interface 320 provides a common set of features that enables quick and easy attachment and/or detachment of the head assembly 162 and/or other head assemblies 162 (e.g., via the pin hardware 164). In accordance with certain embodiments and as will be apparent below and in connection with certain other figures, the mounting interface 320 of the mount assembly 160 includes interface plates 350 (e.g., see FIG. 5) defining interface plate holes for the pin hardware 164 and/or other members/componentry to engage with and support the head assembly 162. Moreover, while there is a head assembly 162 attached to the mount assembly 160 via the mounting interface 320, the mounting interface 320 is able to richly and reliably support loading of the head assembly 162 and any materials handled by the head assembly 162.

The first example head 300 is, by way of example, a forklift head which is adapted to engage palletized materials. Along these lines, the first example head 300 includes a back section 360, a set of forks 362 coupled with the back section 360, and a set of shackle points 364 coupled with the back section 360. This forklift frontend arrangement enables the vehicle 100 (FIG. 1) to efficiently and effectively operate as a combination firefighting robot and forklift at the same time.

The back section 360 provides support for palletized materials while the first example head 300 is tilted back (e.g., while the head assembly 162 is raised), as shown in FIGS. 4 and 5. The set of forks 362 provide a bottom support surface (or platform) which is capable of being slid under the palletized materials while the palletized materials sit on terrain (e.g., by sliding the set of forks 362 underneath the materials through pallet gaps or spaces while the head assembly 162 is horizontal or not tilted back), as shown in FIG. 3. Then, when the head assembly 162 is raised as shown in FIGS. 4 and 5, the set of forks 362 substantially carries the load of the palletized materials. The set of shackle points 364 (e.g., mechanical loops or links) enable strapping and/or other cabling, etc. that further captures/holds palletized materials onto the head assembly 162.

It should be understood that the forklift features described above in connection with the first example head 300 are by way of example only. Modifications and enhancements can be made to the particular layout, geometry, shape, etc. Along these lines, in some arrangements, the set of forks 362 are simply welded in place (e.g. to the frame) to form one solid piece so the user can remove/replace the entire attachment via the quick-attach. In other arrangements, the fork members are movable side to side to accommodate different sizes of palletized materials (e.g., different pallet sizes and/or shapes), and so on. Further details will now be provided with reference to FIGS. 6 through 10.

Figure 6:
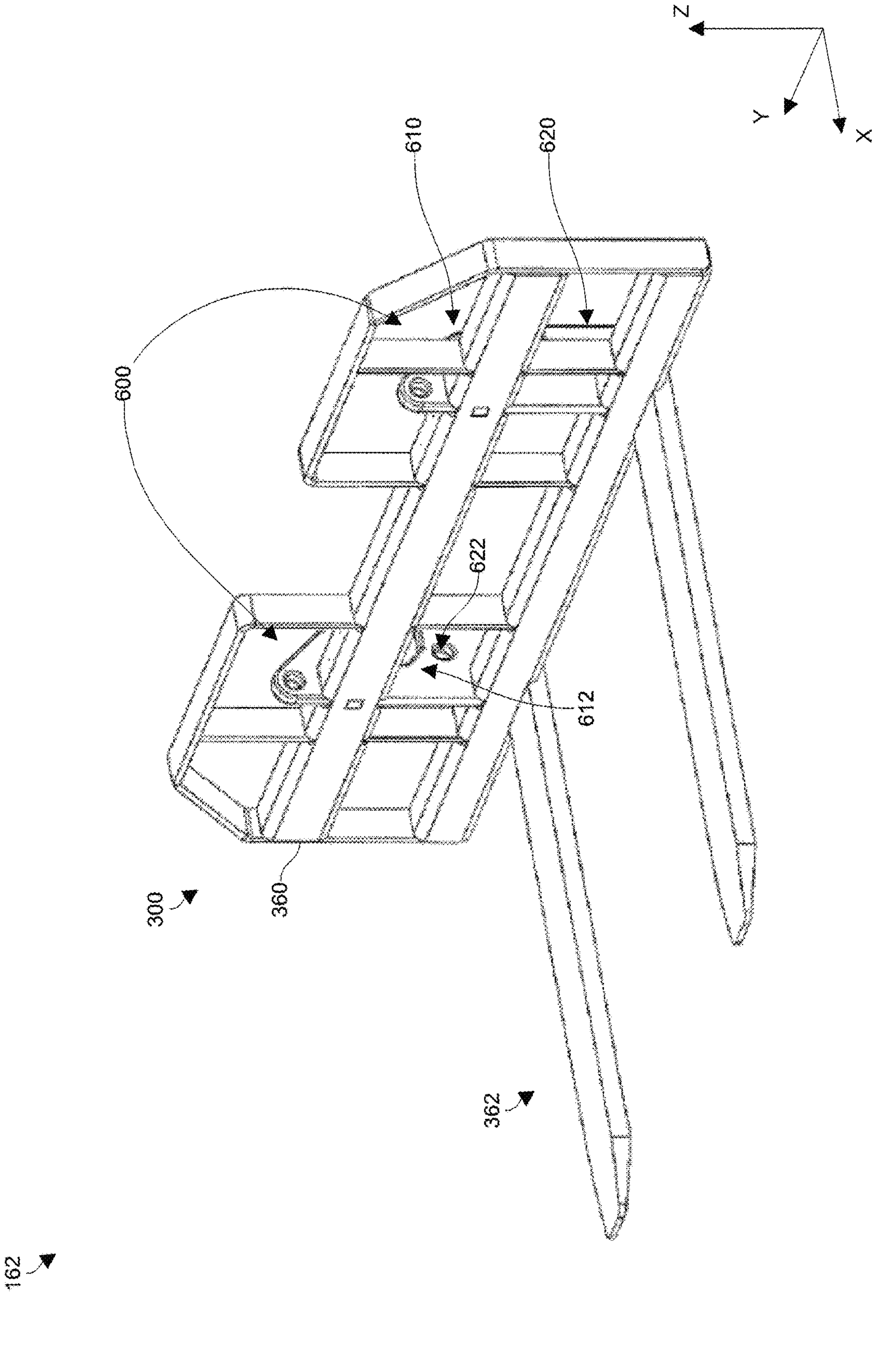
FIG. 6 is a perspective view of the first example head in accordance with certain embodiments.
Figure 7:
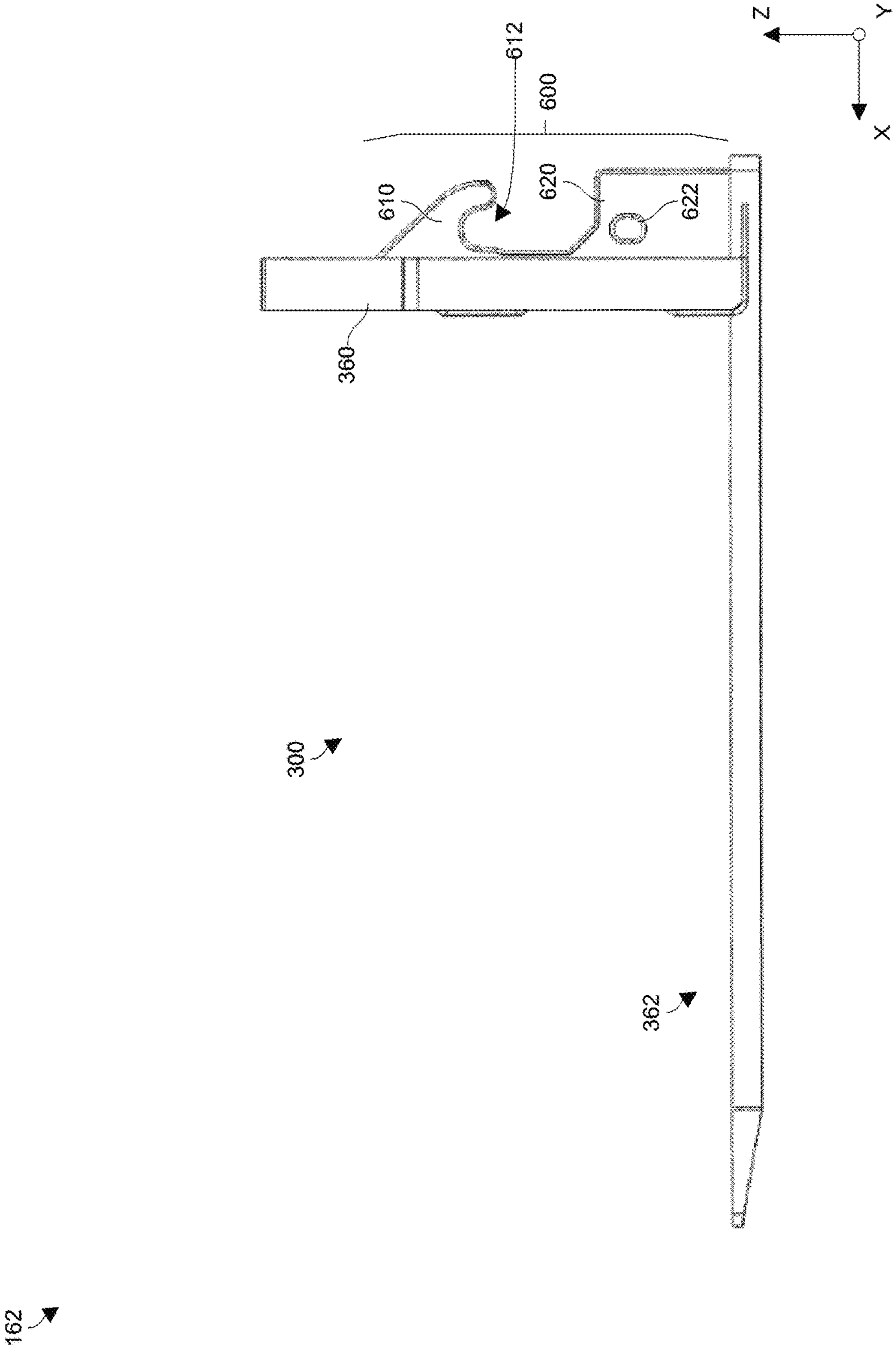
FIG. 7 is a side view of the first example head in accordance with certain embodiments.
Figure 8:
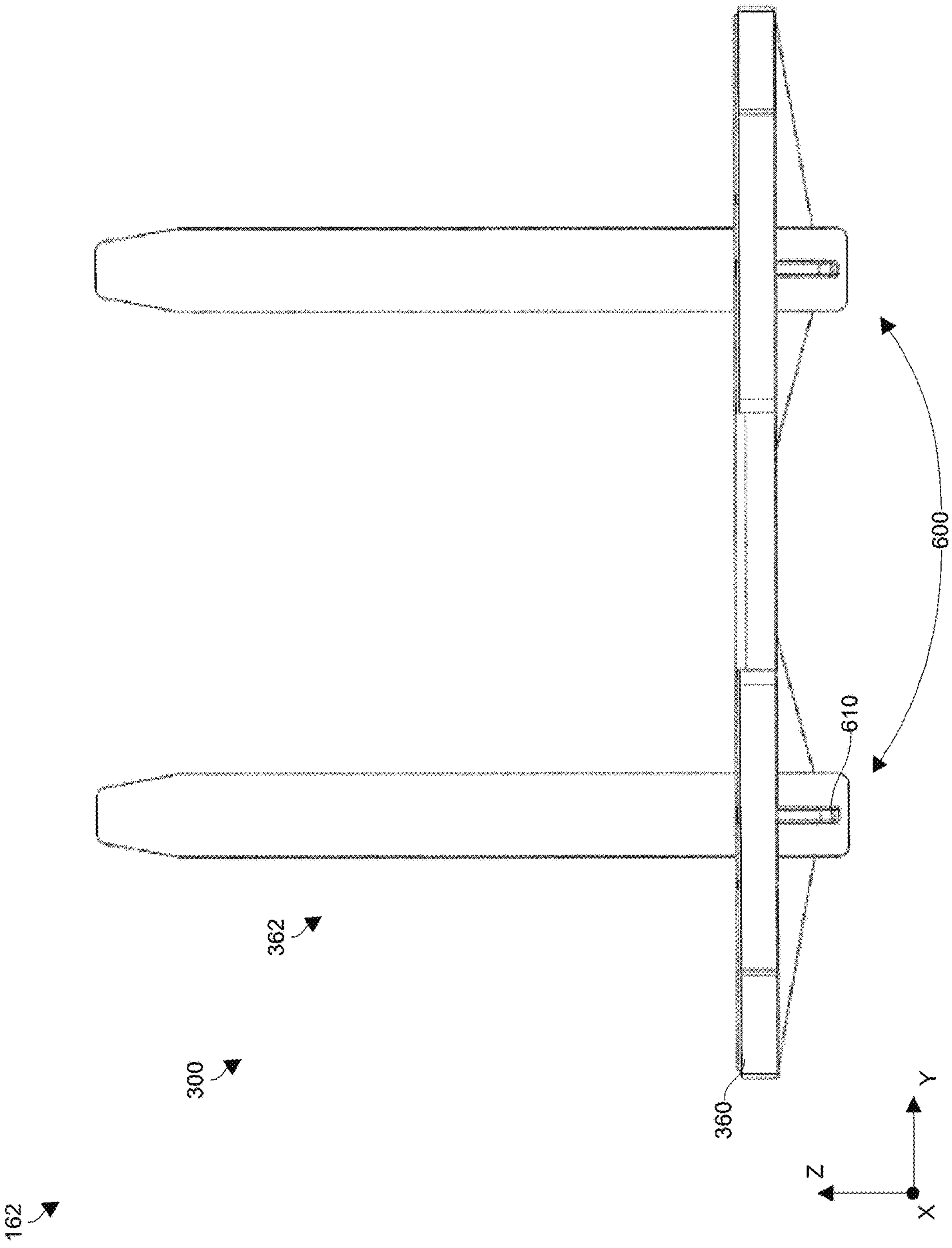
FIG. 8 is a top view of the first example head in accordance with certain embodiments.
Figure 9:
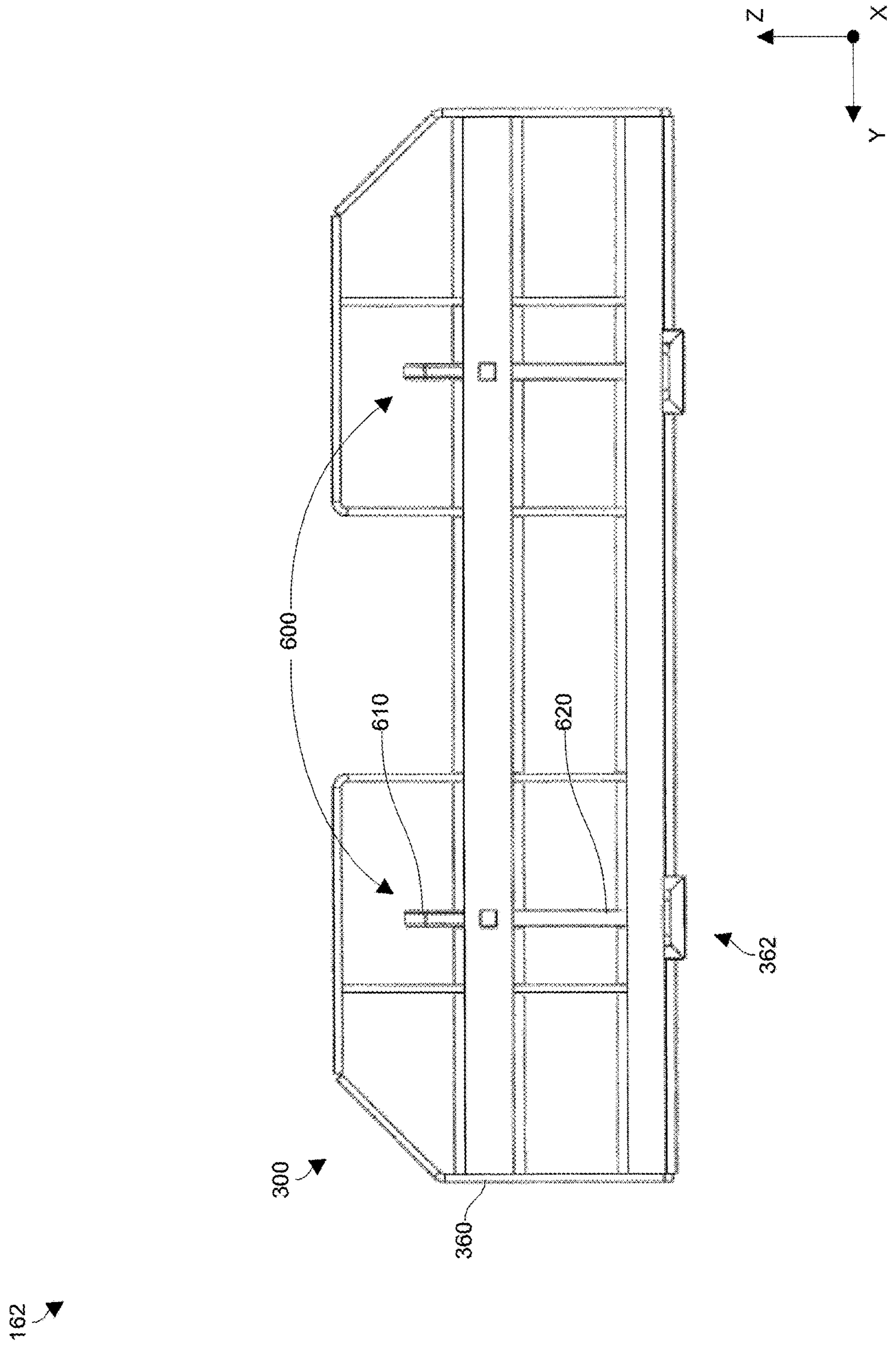
FIG. 9 is a front view of the first example head in accordance with certain embodiments.
Figure 10:
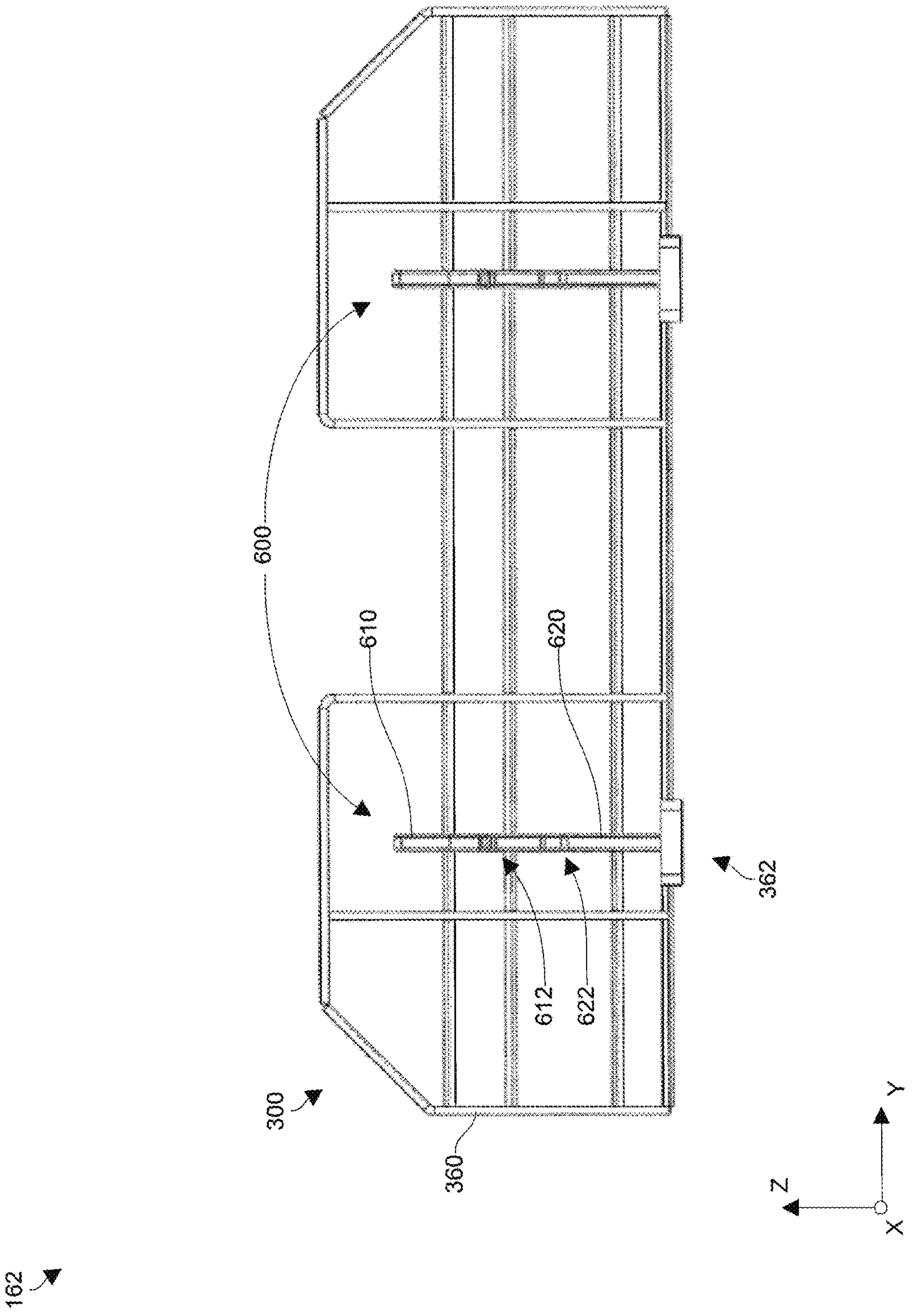
FIG. 10 is a rear view of the first example head in accordance with certain embodiments.

FIGS. 6 through 10 show various details of the head assembly 162 having the first example head 300 in accordance with certain embodiments. FIG. 6 is a perspective view of the head assembly 162. FIG. 7 is a side view of the head assembly 162. FIG. 8 is a top view of the head assembly 162. FIG. 9 is a front view of the head assembly 162. FIG. 10 is a rear (or back) view of the head assembly 162.

As shown in FIGS. 6 through 10 and as mentioned earlier in connection with FIGS. 3 through 5, the head assembly 162 includes the first example head 300 and a set of mounting portions 600 coupled with the head 300. The manner in which the set of mounting portions 600 couple with the head 300 may depend on the particular geometry of the head 300.

The set of mounting portions 600 forms (or provides) an attachment interface constructed and arranged to align with and attach to the common mounting interface 320 of the mount assembly 160 (FIGS. 3 through 5). At this point, it should be understood that other heads may have a similar set of mounting portions 600 enabling those heads to similarly align with and attach to the common mounting interface 320 of the mount assembly 160.

As best seen in FIG. 7, the set of mounting portions 600 of the head assembly 162 includes hook portions (or upper catch sections) 610 and head assembly plates (or fixation points) 620. These hook portions 610 and head assembly plates 620 correspond with upper catches and the interface plates 350 of the mount assembly 160 (e.g., see FIG. 5).

In accordance with certain embodiments, the hook portions 610 are claw shaped sections that extend from head 300 in a downward direction (e.g., the negative Z-direction in FIG. 7) and provide openings 612 to enable the head assembly 162 to hang from the upper catches of the mount assembly 160 when the mount assembly 160 lifts the head assembly 162. Along these lines, the mount assembly 160 may be provisioned with one or more pin (or bar) shaped segments that extend horizontally from the interface plates 350 of the mount assembly 160 to engage (or catch within) the hook portions 610 (e.g., to insert into or install within the openings 612 defined by the claw shaped sections).

The one or more pin shaped segments (e.g., horizontal pins configured to enter the hook portions 610) may be part of the mount assembly 160 and include bar segments or a full bar extending laterally outward along the Y-axis. Alternatively, the one or more pin shaped segments may be a portion of the pin hardware 164 (e.g., clevis pins). The materials and diameters for the one or more pin shaped segments may be sufficient (e.g., strength, resiliency, rigidity, combinations thereof, etc.) to enable effective transfer at least a portion of a load from the head assembly 162 to the mount assembly 160.

Additionally, the head assembly plates 620 (or simply mounting plates 620) of the head assembly 162 line up with the interface plates 350 of the mount assembly 160 to enable holes 622 within the plates 620, 350 (e.g., see FIG. 7) to align for installation of the pin hardware 164 (e.g., also see FIGS. 1 and 2) which is then able to serve as fixation points and secure the head assembly 162 to the mount assembly 160. Along these lines, the pin hardware 164 includes horizontal pins (e.g., clevis pins) which are capable of remaining in place through corresponding holes via cotter pins (e.g., which insert through bores within the clevis pins).

In some embodiments, the hook portions 610 and the plates 620 are essentially vertical mounting plates secured to a rear side of the back section 360. Such can be integral or welded together.

With the hook portions 610 captured by mount assembly 160 and the plates 620, 350 locked together by the pin hardware 164, the head assembly 162 and the mount assembly 160 are richly and reliably connected together. Along these lines, any load provided by the head assembly 162 is easily transferred from the mounting portions 600 of the head assembly 162 through to the interface plates 350 of the mount assembly 160 and vice versa. Accordingly, the vehicle 100 (FIG. 1) is able to effectively maneuver the head assembly 162 to perform useful work and there is no risk of the head assembly 162 inadvertently releasing from the mount assembly 160.

In some arrangements, the pin hardware 164 includes clevis pins constructed and arranged to insert through the mounting plate holes of the head assembly 162 and the interface plate holes of the mount assembly 160. The materials and diameters for the clevis pins may be such to enable effective transfer of at least a portion of a load from the head assembly 162 to the mount assembly 160.

In some arrangements, the pin hardware 164 further includes cotter pins constructed and arranged to insert through the clevis pins to retain the clevis pins within the mounting plate holes and the interface plate holes. Accordingly, the cotter pins are able to retain (or lock) the clevis pins in place to prevent inadvertent disconnection. Further details will now be provided with reference to FIGS. 11 through 16.

Figure 11:
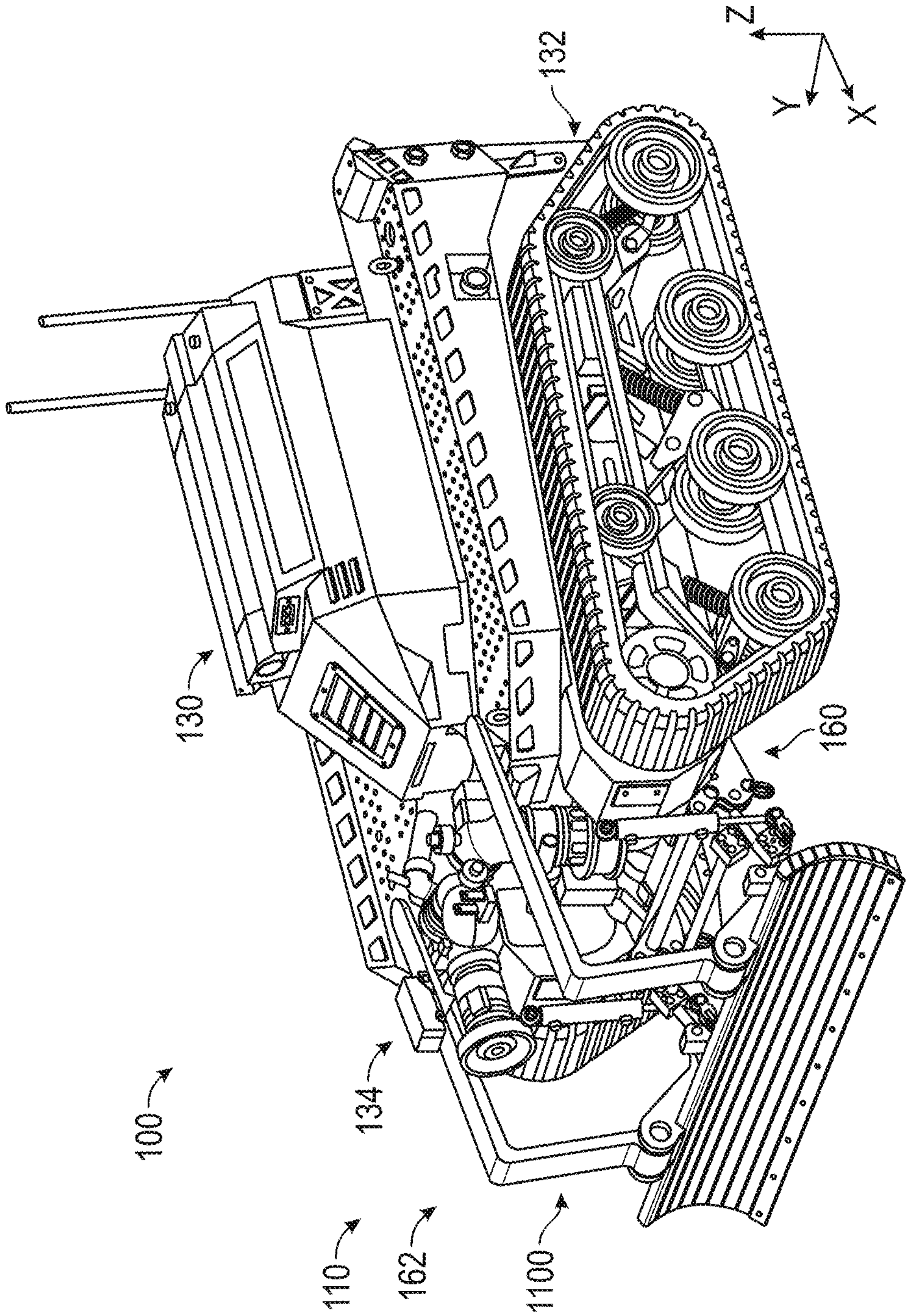
FIG. 11 is a perspective view of the firefighting robotic vehicle when the frontend attachment has a second example head while the second example head is in a first configuration in accordance with certain embodiments.
Figure 12:
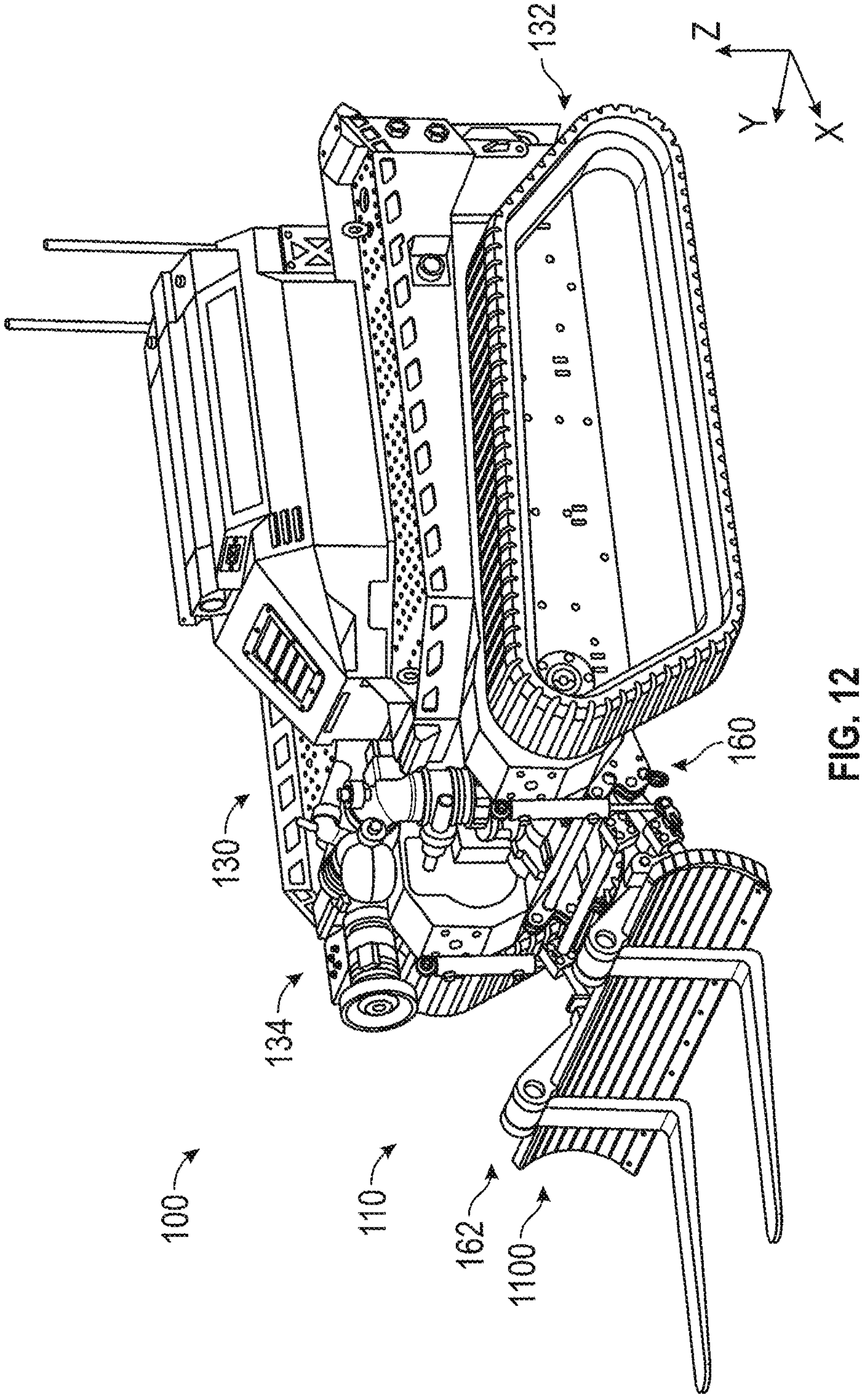
FIG. 12 is a perspective view of the firefighting robotic vehicle while the second example head is in a second configuration in accordance with certain embodiments.
Figure 13:
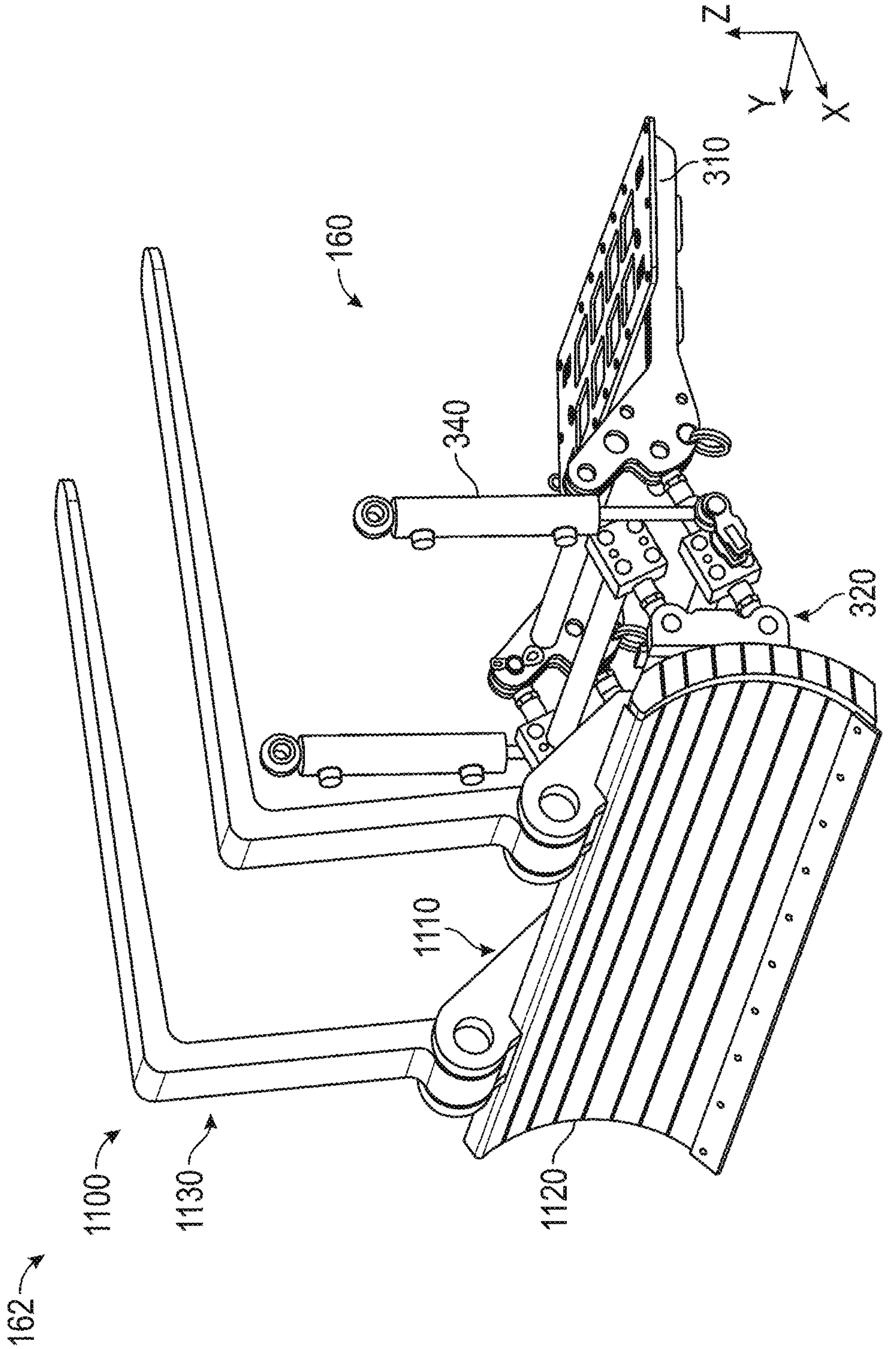
FIG. 13 is a perspective view of the frontend attachment having the second example head in the first configuration in accordance with certain embodiments.
Figure 14:
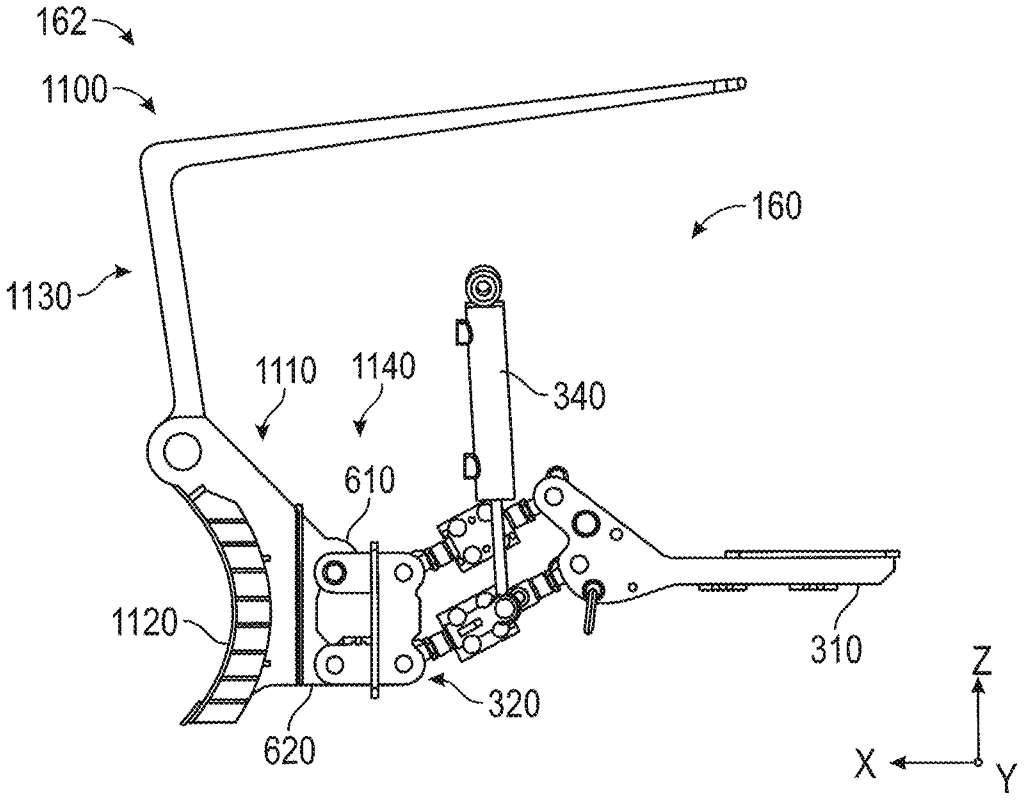
FIG. 14 is a side view of the frontend attachment having the second example head in the first configuration in accordance with certain embodiments.
Figure 15:
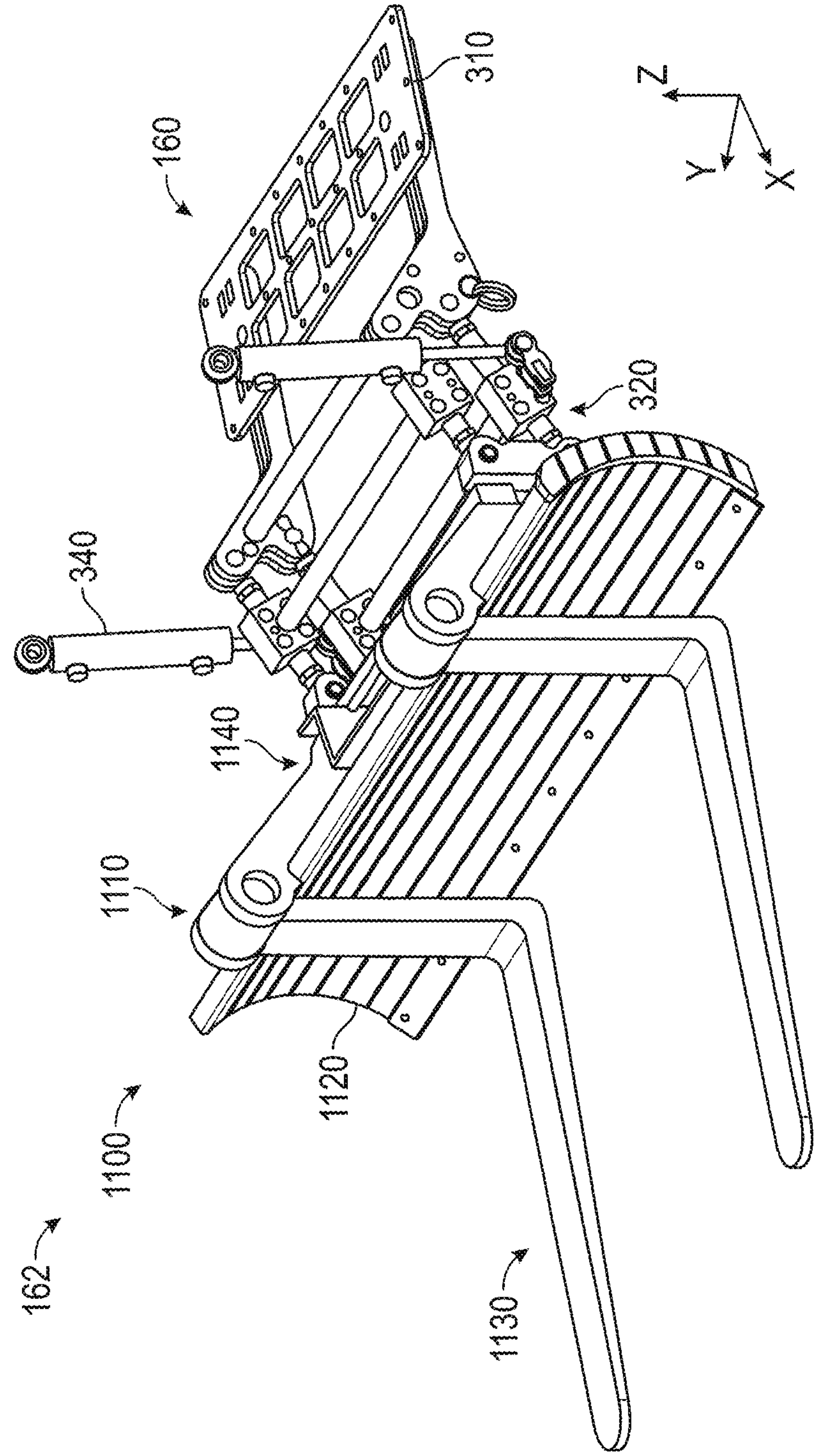
FIG. 15 is a perspective view of the frontend attachment having the second example head in the second configuration in accordance with certain embodiments.
Figure 16:
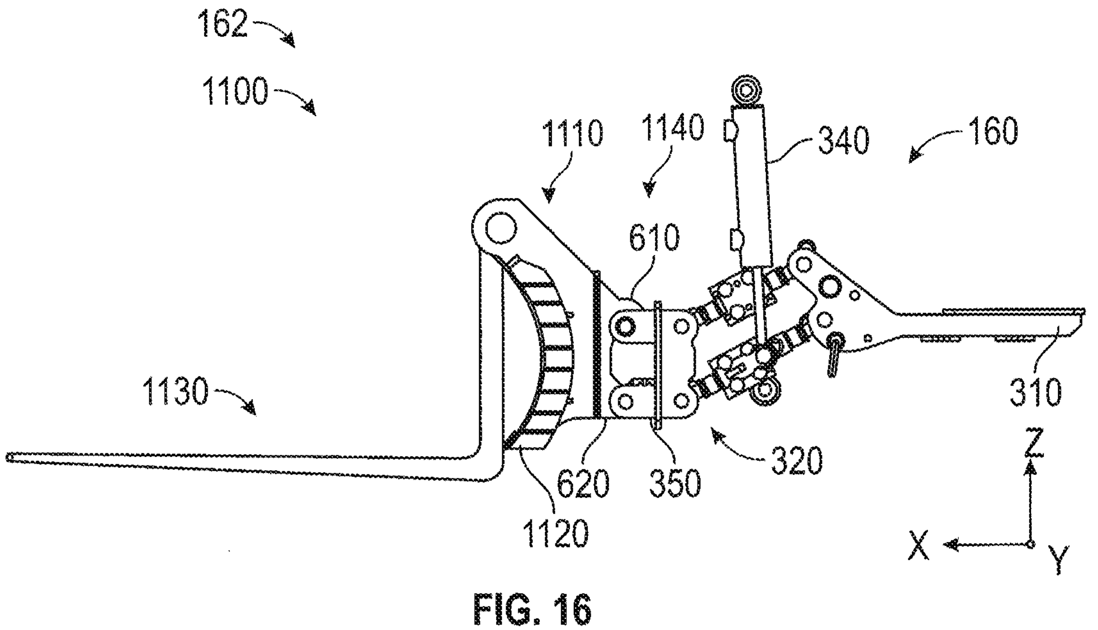
FIG. 16 is a side view of the frontend attachment having the second example head in the second configuration in accordance with certain embodiments.

FIGS. 11 through 16 show various details of the frontend attachment 110 having a second example head 1100 in accordance with certain embodiments. FIG. 11 is a perspective view of the firefighting robotic vehicle 100 equipped with the second example head 1100 while the second example head 1100 is in a stowed configuration. FIG. 12 is a perspective view of the firefighting robotic vehicle 100 equipped with the second example head 1100 while the second example head 1100 is in a deployed configuration. FIG. 13 is a perspective view of the frontend attachment 110 with the second example head 1100 in the stowed configuration. FIG. 14 is a side view of the frontend attachment 110 with the second example head 1100 in the stowed configuration. FIG. 15 is a perspective view of the frontend attachment 110 with the second example head 1100 in the deployed configuration. FIG. 16 is a side view of the frontend attachment 110 with the second example head 1100 in the deployed configuration.

As shown in FIGS. 11 through 16, the frontend attachment 110 includes the same mount assembly 160 as described earlier. However, the head assembly 162 includes the second example head 1100 in place of the first example head 300. Such a situation may exist when the first example head 300 is easily and quickly replaced with the second example head 1100 (e.g., in the field during a fire event).

The second example head 1100 is, by way of example, a combination (or hybrid) plow-forklift head which is adapted to push and/or engage materials. Accordingly, in a first configuration (e.g., see FIG. 11), the firefighting robotic vehicle 100 is able to use the second example head 1100 to push (or plow) materials. However, in a second configuration (e.g., see FIG. 12), the firefighting robotic vehicle 100 is able to use the second example head 1100 to engage palletized materials.

Along these lines, the second example head 1100 includes a support section 1110, a plow section 1120 coupled with the support section 1110, and a set of forks 1130 coupled with the support section 1110 (e.g., see FIGS. 13-16). This combination frontend arrangement enables the firefighting robotic vehicle 100 (FIGS. 11 and 12) to efficiently and effectively operate as a combination firefighting robot and plow/forklift equipment at the same time.

The support section 1110 includes a set of mounting portions 1140 (e.g., see FIG. 14) which forms (or provides) an attachment interface constructed and arranged to align with and attach to the common mounting interface 320 of the mount assembly 160 (FIGS. 3 through 5). Along these lines, the set of mounting portions 1140 includes upper hook portions 610 and head assembly plates 620 which correspond with the interface plates 350 of the mount assembly 160 to provide lower fixation points (e.g., also see FIGS. 5 and 7). Along these lines, the hook portions 610 may be claw shaped sections that extend from head 300 in a downward direction (e.g., see the negative Z-direction in FIG. 7) and provide openings 612 to enable the head assembly 162 to hang from the mount assembly 160 when the mount assembly 160 lifts the head assembly 162. Additionally, as mentioned earlier, the mount assembly 160 may be provisioned with one or more pin (or bar) shaped segments that extend horizontally from the interface plates 350 of the mount assembly 160 to catch within the hook portions 610 (e.g., to insert into or install within the openings 612 defined by the claw shaped sections).

With the set of mounting portions 1140 providing a structure similar to that of the set of mounting portions 600 described earlier in connection with the first example head 300, the first example head 300 is easily replaced by the second example head 1100 via the earlier-described pin hardware 164 (e.g., see FIG. 1) and vice versa. Along these lines, the common mounting interface 320 of the mount assembly 160 is able to detach from one head and attach to another head by simply aligning pin structures, etc. Moreover, other heads that provide a similar structure may be swapped in/out with these heads 300, 1100 as well. Such easy replacement enables effective and efficient changing of equipment attached to the firefighting robotic vehicle 100 with less effort and involving fewer parts.

As shown in FIGS. 11, 13, and 14, the set of forks 1130 are stowed (e.g., retracted/rotated back). In some arrangements, the set of forks 1130 is simply lifted until inverted and then kept in place in that position by gravity until deployed again. In some arrangements, the vehicle body 130 has landing zones (FIG. 11) to provide cushioning when the set of forks 1130 is folded back. As shown in FIGS. 12, 15, and 16, the set of forks 1130 are deployed (e.g., extended/rotated forward).

The set of forks 1130 hinge with the support section 1110 at fork member "knees". By way of example, there are two fork members (left and right) formed via fork legs and fork feet. The fork feet connect with the fork legs at "heel" sections and extend outwardly to "toe" sections. In some arrangements, the fork members are movable side to side to accommodate different sizes of palletized materials (e.g., different pallet sizes and/or shapes).

In some arrangements, the plow section 1120 defines a single straight edge which is perhaps reinforced. In other arrangements, the plow section 1120 defines other shapes such as a v-shaped blade. Further details will now be provided with reference to FIGS. 17 and 18.

Figure 17:
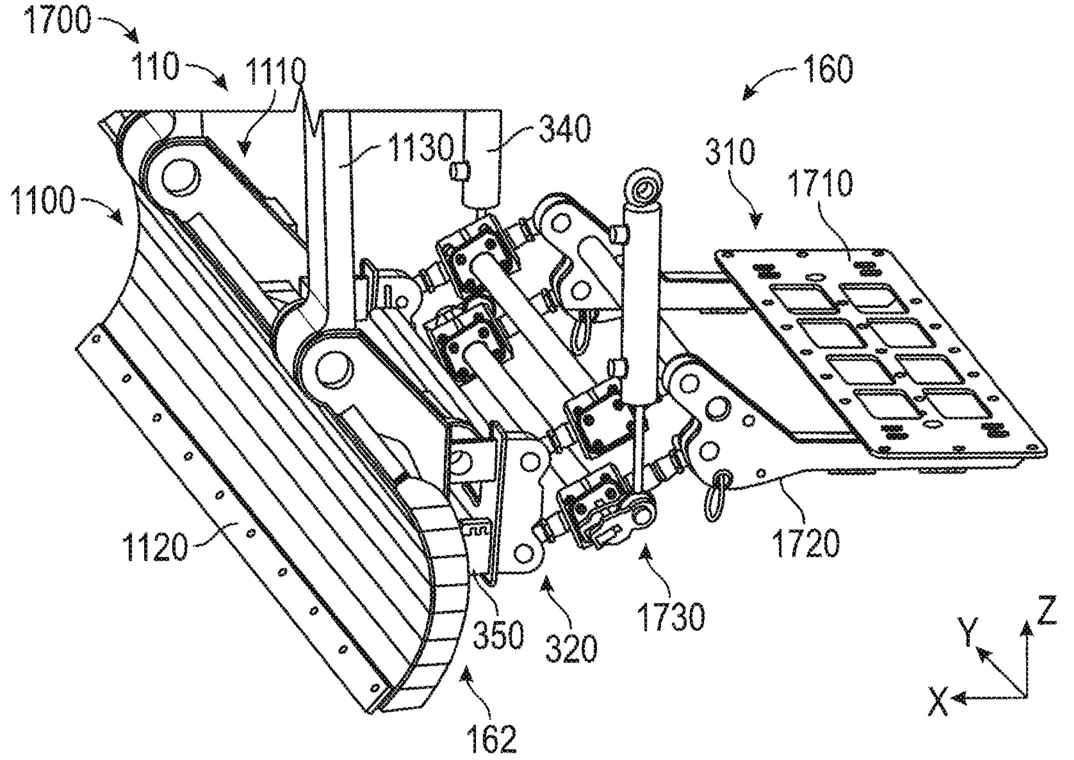
FIG. 17 is a perspective view of a portion of the frontend attachment having the second example head in accordance with certain embodiments.
Figure 18:
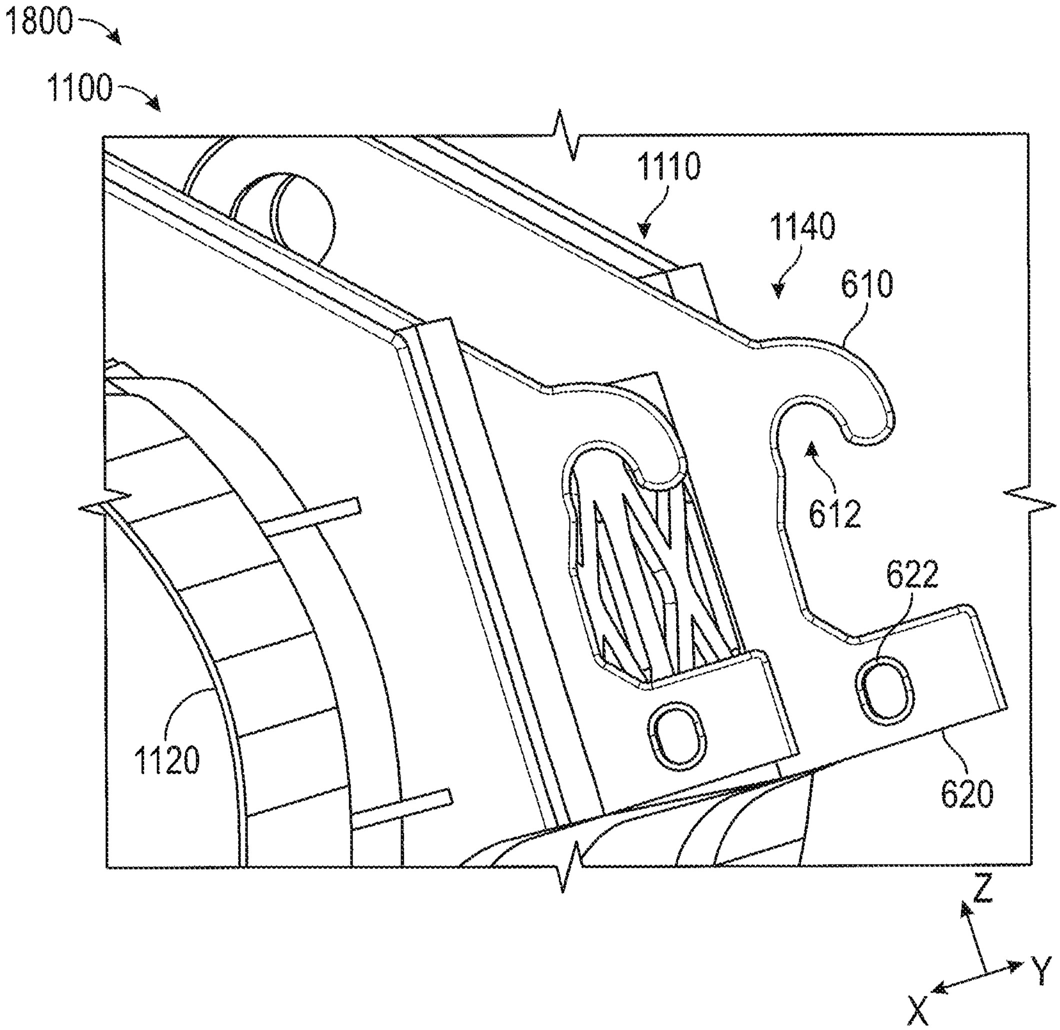
FIG. 18 is a perspective view of a portion of the second example head in accordance with certain embodiments.

FIGS. 17 and 18 show certain frontend attachment details relating to the second example head 1100 in accordance with certain embodiments. FIG. 17 is a partial perspective view 1700 showing a frontend attachment 110 which includes the second example head 1100 in accordance with certain embodiments. FIG. 18 is a partial perspective view 1800 showing how the support section 1110 couples with the plow section 1120 and certain details of the support section 1110 in accordance with certain embodiments.

As shown in the view 1700 of FIG. 17, the set of forks 1130 are upright in a stowed position. Such a configuration enables the plow section 1120 to operate effectively without interference from the set of forks 1130. Along these lines, the mount assembly 160 is able to support and maneuver the head assembly 162, which is currently serving as a plow, to perform useful work.

As further shown in the view 1700 of FIG. 17, the base 310 of the mounting assembly 160 may include a push plate 1710 and brackets 1720 (e.g., left and right). Such brackets 1720 may be welded to or integral with the push plate 1710. Additionally, the mounting assembly 160 may include other features such as holes, lips, etc. for strength, which serve as tow points, and so on.

As further shown in the view 1700 of FIG. 17, the mount assembly 160 includes a compound hinge assembly 1730 which provides multiple hinge points between the base 310 and the interface plates 350. Additionally, the compound hinge assembly 1730 may be fortified with cross-braces (e.g., horizontal steel tubes) to provide lateral support and stabilization (e.g., see FIG. 17). Furthermore, joiners connect fore-link arms to the cross braces and bottom joiners connect to actuator shafts e.g., for lifting and lowering.

As shown in the view 1800 of FIG. 18, the set of mounting portions 1140 are configured to easily enable detachment of the second example head 1100 from the mount assembly 160 (FIG. 17). Along these lines, the pin hardware 164 (e.g., a set of clevis pins held in place by a set of cotter pins) is removed to enable the mounting assembly 160 (e.g., see the common mounting interface 320 in FIG. 5) to be lowered and disengaged from the second example head 1100 (see the openings 612 in FIG. 18).

At this point, another head may be attached to the mounting assembly 160 following the above-described steps in reverse. Such a process may be easily performed in the field (e.g., during a fire event) with less effort and complexity that replacing an entire frontend attachment.

It should be appreciated that the set of mounting portions 1140 engages with the upper catches and lower fixation point features of the mounting interface 320 (FIG. 17). Along these lines, the hook portion 610 and plates 620 are well suited to provide such features. Nevertheless, other structures and/or geometries are suitable for provide catch and fixation point features as well. Further details will now be provided with reference to FIG. 19.

Figure 19:
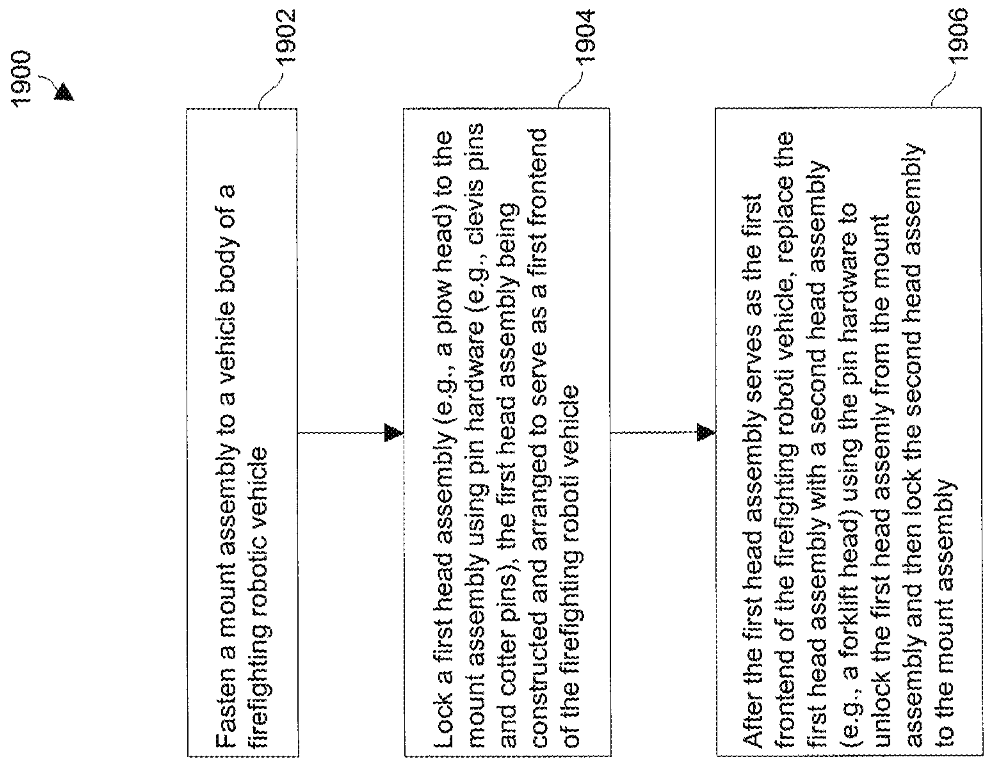
FIG. 19 is a flowchart of a procedure to operate a firefighting robotic vehicle in accordance with certain embodiments.

FIG. 19 is a flowchart of a procedure 1900 to operate a firefighting robotic vehicle in accordance with certain embodiments. Such a procedure provides for simple and effective equipment changing in the field.

At 1902, a mount assembly is fastened to a vehicle body of the firefighting robotic vehicle. Along these lines, the mount assembly may include a base which is richly and robustly attached to an underside of the vehicle body (e.g., the suspension, the chassis, etc.) of the vehicle.

At 1904, the first head assembly is locked to the mount assembly using pin hardware. The first head assembly is constructed and arranged to serve as a first frontend of the firefighting robotic vehicle (e.g., a plow head to enable the vehicle to operate as a plow).

At 1906, after the first head assembly serves as the first frontend of the firefighting robotic vehicle, the first head assembly is replaced with a second head assembly using the pin hardware to unlock the first head assembly from the mount assembly and then lock the second head assembly to the mount assembly. The second head assembly is constructed and arranged to serve as a second frontend of the firefighting robotic vehicle (e.g., a forklift head to enable the vehicle to operate as a forklift).

At this point, it should be understood that 1904 and 1906 may take very little time and effort. Moreover 1904 and 1906 may be repeated for other interchangeable heads (e.g., straight plow head, a v-shaped plow head, a plow-forklift head, a forklift head, a shield, a digger, etc.).

As described above, improved techniques are directed to changing attachments used with a firefighting robotic vehicle 100. The techniques include providing a mount assembly 160 that attaches to the vehicle 100. The mount assembly 160 includes a common mounting interface 320 constructed and arranged to receive multiple interchangeable head assemblies. The head assemblies can include various types of plow heads, pallet forks, or other equipment (such as a combination plow-pallet fork attachment described in further detail below). In some arrangements, the common mounting interface 320 of the mount assembly 160 includes an upper catch and a lower fixation point. Each head may include an upper hook adapted to engage the upper catch of the common interface. Each head may further include a lower fixation point arranged to intersect the lower fixation point of the common interface when the head is oriented in alignment for operation to enable quick locking via a set of pins.

Advantageously, the improved technique allows different heads to be used with the same common mounting interface 320, greatly reducing the total amount of equipment that must be stored and transported to the site of a fire. As the common mounting interface 320 can remain in place, the amount of time and labor required to change one head to another is typically much less than what would be needed if entire assemblies were switched.

While various embodiments of the present disclosure have been particularly shown and described, it will be understood by those skilled in the art that various changes in form and details may be made therein without departing from the spirit and scope of the present disclosure as defined by the appended claims.

Figure 20:
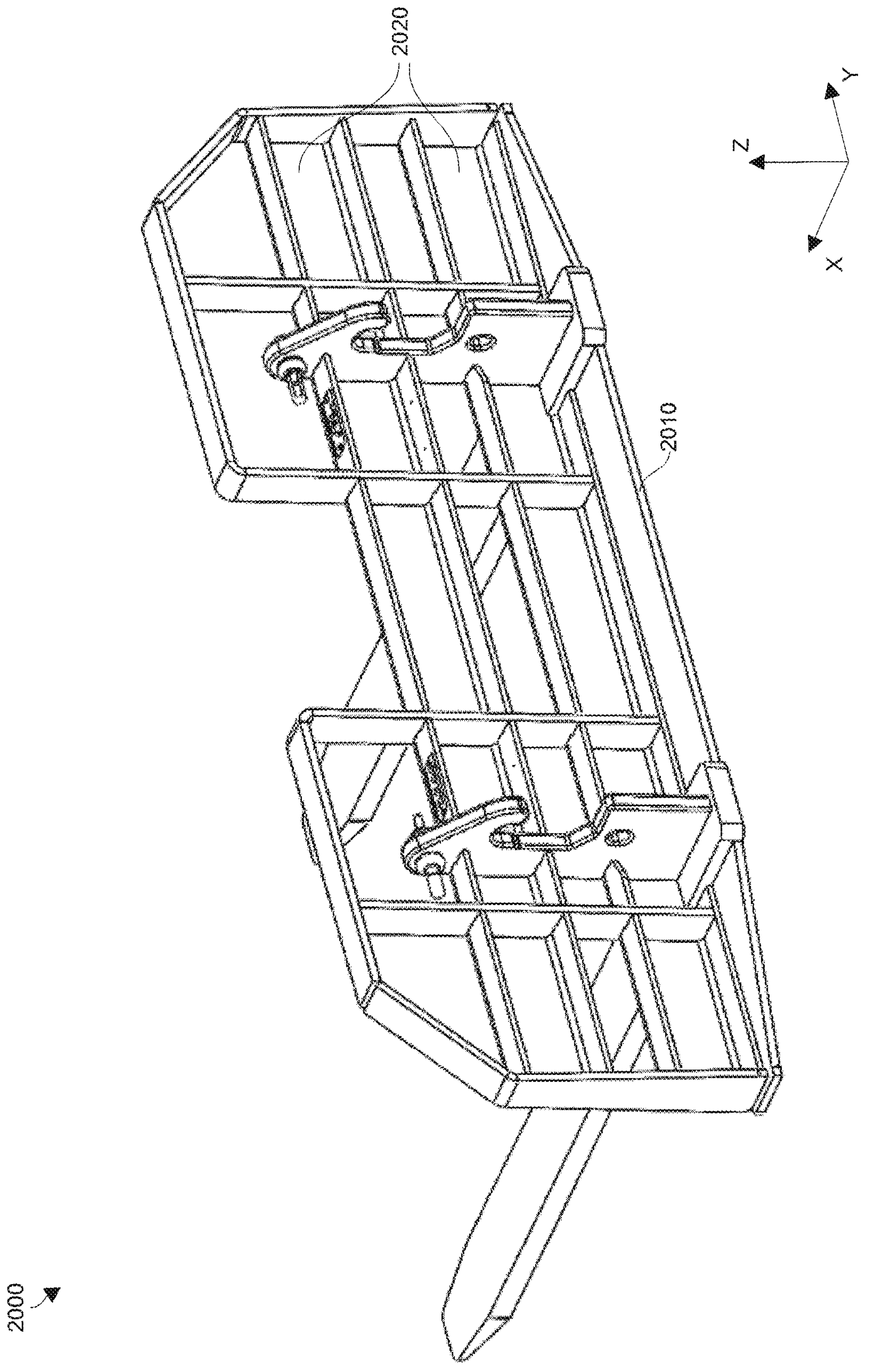
FIG. 20 is a perspective view of the third example head in accordance with certain embodiments.

Along these lines, FIG. 20 is a perspective view of the third example head 2000 in accordance with certain embodiments. The third example head 2000 is a forklift-style head which is similar to that of the first example head 300 (e.g., also see FIGS. 6 through 10).

However, certain features of the third example head 2000 are slightly adjusted (e.g., strengthened or augmented) compared to the first example head 300. Along these lines, the third example head 2000 includes a reinforcement plate which extends fully across the back section of the third example head 2000. Additionally, the cross bars 2020 are wider (or thicker). Other modifications and/or enhancements have or can be made, e.g., trimming the bent flanges, thicker plates, added layers, stiffer weldments, etc.

Additionally, it should be appreciated that conventional plows are limited in their applicability. For example, a plow may not be optimal for moving boxes or pallets of equipment. A better solution would be a forklift. However, swapping a plow for a pallet fork would require a complex changeover of equipment, which would put personnel and equipment at risk in an active-fire situation. It would also result in a proliferation of heavy equipment, as the owner of the robot would have to purchase and store both a plow attachment and a separate pallet fork attachment. The owner may also need to transport both the plow attachment and the pallet fork attachment to the scene of a fire. What is needed is a safer, more economical, and more convenient solution for providing both plow and pallet fork functionality in a tracked vehicle.

The above need is addressed at least in part with a plow-pallet fork attachment (PFA) for a tracked vehicle. The PFA includes a pair of fork members attached to a plow assembly by a pair of hinges that permit the fork members to be selectively deployed or stowed. The PFA is thus operable as a pallet fork when the fork members are deployed and as a plow when the fork members are stowed.

Advantageously, the PFA avoids having to provide separate plow and pallet fork attachments. Rather, a common attachment may be used for both. Many activities can benefit from this combination, and the improved technique allows operators to switch between the two operating modes easily. The ability to extend (deploy) and retract (stow) the fork members promotes flexibility and easy changeover. Stowing the fork members when not deployed avoids hazards to personnel and equipment and allows the tracked vehicle to be much more maneuverable than it would be if the forks were permanently deployed.

Certain embodiments are directed to a PFA (plow-pallet fork attachment). Other embodiments are directed to a tracked vehicle equipped with a PFA. Still other embodiments are directed to a method of using a PFA in a tracked vehicle.

In some examples, the pair of hinges that connect the fork members to the plow assembly are adjacent to a top edge of the plow.

In some examples, the hinges have shafts configured with pins (e.g., cotter pins) to allow for quick removal.

In some examples, the hinges are spring-loaded to provide a lifting force weaker than gravity but still sufficient to reduce the amount of force needed to lift the fork members.

In some examples, the hinges include a tab, pin, or other structure that limits backwards rotation of fork members in the stowed position.

In some examples, each of the hinges forms a "knee" joint, with a "leg" of a respective fork member extending away from the hinge to a respective "foot," which extends approximately perpendicularly to the leg.

In some examples, the foot of each fork member is tapered and has a "heel" and a "toe," the toe being lower than the heel when the fork member is deployed.

In some examples, the vehicle may include landing zones for the left and right fork members in the stowed position. The landing zones provide an area for receiving the fork members and may include padding that reduces impact forces and noise when the fork members are stowed.

In some examples, the fork members when deployed rest against a bottom blade of the plow and are held in place by gravity.

In some examples, the bottom blade of plow is composed of high-grade steel.

In some examples, a bumper is placed behind the heel of the fork member to provide cushioning between the fork member and the bottom blade.

In some examples, the heels of the fork members are closer to the ground than the bottom blade of the plow when the fork members are in the deployed position.

In some examples, the fork members are raised or lowered by raising and lowering the plow.

In some examples, the plow is raised and lowered by a pair of actuators, such as hydraulic cylinders or electric motors.

In some examples, the fork members have one or more fork actuators that provide controlled deployment and retraction of the fork members. The fork actuators may be hydraulic, electric, and/or pneumatic, for example.

In some examples, the fork actuators are configured to automatically stow the fork members when the plow is raised by more than a predetermined amount.

In some examples, the PFA is coupled to the tracked vehicle via a compound hinge assembly that keeps the fork members substantially level when raising and lowering the plow and fork members via the actuators.

In some examples, the plow and fork members tilt back by less than 10 degrees when raised by the actuators.

In some examples, the compound hinge assembly includes left and right brackets connected to or integral with a push plate that attaches to a bottom of the tracked vehicle. Each of the left and right brackets forms upper and lower hinged attachments to a respective pair of upper and lower fore-link arms. The fore-link arms on each side extend to a plow head, where the fore links form upper and lower hinged attachments to the plow head.

In some examples, one or more cross-braces (e.g., tubes) attach between left and right fore-link arms for providing resistance to lateral forces.

In some examples, each of the left and right brackets extending from the push plate includes a hole that mounts to a respective tow point of the vehicle, for providing increased strength of attachment.

In some examples, the plow head is modular, including both a plow head gear that attaches to the fore-link arms and an interchangeable plow head, e.g., attached to the head gear using removeable pins.

In some examples, the plow head is straight.

In other examples, the plow head is V-shaped, extending further forward in the center than at the sides.

The above-described PFA system for a firefighting robotic vehicle is a solution to the need for moving palletized/miscellaneous items to, and from the scene of a fire, clear a path, as well as to transport pallets of firefighting extinguishing equipment to fire trucks that are already on scene and are actively engaged with the thermal event. With the ability also to stow the forks in a rearward position easily, such features are able to significantly reduce vehicle operating space allowing for greater mobility when not in use.

In accordance with certain embodiments, a mounting system for fork members has been devised using an existing vehicle hydraulic plow system as the lifting mechanism for the forks, while retaining the capability of the plow. Further, the forks are easily removable, or they are stowable while attached to the vehicle.

In an example, the forks are shaft-style forks allowing them to pivot about an upper mount point, such as a 2-inch pivot pin or shaft, which has a retaining pin (e.g., cotter pin) to allow for easy removal. When forks members are deployed, they are supported by the main pivot pins/mounts and the bottom ‘cutting edge’ of the blade. To stow the forks, they may simply be lifted individually until inverted and kept by gravity in that rotated-back position until deployed again. In some examples, the forks may be mechanically retained in the stowed and/or deployed positions. Automated actuation of fork members may alternatively be provided, e.g., using electric motors, hydraulic cylinders, pneumatic actuators, or the like, which move the fork members between the deployed and stowed positions, either together or independently.

Even given the versatility of the PFA described above, a need still arises for swapping among the PFA, some other plow, some other pallet fork, or some other attachment, such as one that provides specialized abilities. Prior approaches to swapping attachments may involve removing one attachment apparatus completely from the vehicle and then attaching another attachment apparatus to the vehicle in its place. Such changeovers can be time consuming and labor intensive. They can also involve many parts, as each attachment apparatus has its own components, which are independent from components of other attachment apparatus. A consequence of this independence of apparatus is that the owner or operator of a firefighting vehicle must generally store multiple large apparatus on site and may need to transport such large apparatus to the location of a fire when the vehicle is being used.

The pallet fork attachment system for the firefighting robotic vehicle lines is a solution to the need for moving palletized/miscellaneous items to, and from the scene of a fire, clear a path, as well as to transport pallets of firefighting extinguishing equipment to fire trucks that are already on scene and are actively engaged with the thermal event. The quick attach nature allows for an easy change between fork, straight and v-plows, as well as other equipment.

A mounting system for the forks has been devised utilizing the existing vehicle hydraulic plow system as the lifting mechanism for the forks. Utilizing our own design for a quick attach headgear, the forks are “hung” from the top of the mount and two (2) pins are slid into the bottom of the mount and secured with cotter pins to retain the forks and allow for easy interchangeability with our other attachments.

The forks also have two (2) dedicated shackle points at the top for lifting/tying down as well as the rest of the back rest being usable for tie off locations for loads that are on the forks to help secure loads over uneven ground.

Having described certain embodiments, numerous alternative embodiments or variations can be made. Further, although features have been shown and described with reference to particular embodiments hereof, such features may be included and hereby are included in any of the disclosed embodiments and their variants. Thus, it is understood that features disclosed in connection with any embodiment are included in any other embodiment.

As used throughout this document, the words “comprising,” “including,” “containing,” and “having” are intended to set forth certain items, steps, elements, or aspects of something in an open-ended fashion. Also, as used herein and unless a specific statement is made to the contrary, the word “set” means one or more of something. This is the case regardless of whether the phrase “set of” is followed by a singular or plural object and regardless of whether it is conjugated with a singular or plural verb. Also, a “set of” elements can describe fewer than all elements present. Thus, there may be additional elements of the same kind that are not part of the set. Further, ordinal expressions, such as “first,” “second,” “third,” and so on, may be used as adjectives herein for identification purposes. Unless specifically indicated, these ordinal expressions are not intended to imply any ordering or sequence. Thus, for example, a “second” event may take place before or after a “first event,” or even if no first event ever occurs. In addition, an identification herein of a particular element, feature, or act as being a “first” such element, feature, or act should not be construed as requiring that there must also be a “second” or other such element, feature or act. Rather, the “first” item may be the only one. Also, and unless specifically stated to the contrary, “based on” is intended to be nonexclusive. Thus, “based on” should be interpreted as meaning “based at least in part on” unless specifically indicated otherwise. Although certain embodiments are disclosed herein, it is understood that these are provided by way of example only and should not be construed as limiting.

In some examples, the upper catch of the interface includes a horizontal bar.

In some examples, the upper catch of the interface includes a pair of horizontal pins that are spaced apart.

In some examples, each horizontal pin of the pair of horizontal pins is attached to the interface on both ends of the respective pin, e.g., in a clevis arrangement.

In some examples, the upper hook of the head includes two hook portions that are horizontally spaced apart. Each of the hook portions has a closed top and an open bottom, such that the hook portions can be applied over the horizontal pins or bar from above and the head can hang from the two hook portions.

In some examples, the lower fixation point of the interface includes first and second holes that are horizontally spaced apart.

In some examples, the lower fixation point of the head includes third and fourth holes that are horizontally spaced apart.

In some examples, the lower fixation point of the interface is attached to the lower fixation point of the head by aligning the first and third holes and passing a first pin therethrough and aligning the second and fourth holes and passing a second pin therethrough.

In some examples, the common base further includes a push plate adapted to attach to the bottom of the firefighting vehicle and a compound hinge assembly having first and second ends, the compound hinge assembly coupled to the push plate at the first end and to the mechanical interface at the second end.

In some examples, the head is a plow attachment.

In some examples, the head is a plow-pallet fork attachment.

In some examples, the head is a pallet fork attachment.

In some examples, the pallet fork attachment has forks that are moveable side to side.

In some examples, the pallet fork attachment has dedicated shackle points for lifting and tying down.

In some examples, the pallet fork attachment has a backrest and first and second vertical mounting plates attached to the backrest, the vertical mounting plates providing the upper hook and lower fixation point of the head.

In some examples, the dedicated shackle points are attached to the vertical mounting plates.

It should be understood that a firefighting robotic vehicle was described above to illustrate certain features of the disclosed improvements. Other types of equipment are suitable for use as well such as other types of firefighting equipment, other types of robotic vehicles, and so on. Such modifications and enhancements are intended to belong to various embodiments of the disclosure.

What is claimed is:

1. A firefighting robotic vehicle, comprising:

firefighting equipment;

a vehicle body constructed and arranged to support the firefighting equipment; and a frontend attachment that couples with the vehicle body, the frontend attachment including:

a mount assembly constructed and arranged to attach to the vehicle body, a head assembly constructed and arranged to serve as a frontend of the firefighting robotic vehicle, and pin hardware constructed and arranged to selectively lock the head assembly to the mount assembly and unlock the head assembly from the mount assembly;

wherein the pin hardware of the frontend attachment includes:

a set of clevis pins constructed and arranged to insert through a set of mounting plate holes defined by a set of mounting plates of the head assembly and a set of interface plate holes defined by a set of interface plates of the mount assembly and transfer at least a portion of a load from the head assembly to the mount assembly.

2. The firefighting robotic vehicle as in claim 1, wherein the mount assembly of the frontend attachment includes:

a base constructed and arranged to attach to an underside of the vehicle body; and a mounting interface coupled with the base, the mounting interface being constructed and arranged to interface with the head assembly.

3. The firefighting robotic vehicle as in claim 2, wherein the head assembly of the frontend attachment includes:

a head; and a set of mounting portions coupled with the head, the set of mounting portions being constructed and arranged to align with the mounting interface of the mount assembly to enable the pin hardware to lock the head assembly to the mount assembly.

4. The firefighting robotic vehicle as in claim 3, wherein the mounting interface of the mount assembly includes the set of interface plates defining the set of interface plate holes; and wherein the set of mounting portions of the head assembly includes the set of mounting plates defining the set of mounting plate holes to align with the set of interface plate holes defined by the set of interface plates.

5. The firefighting robotic vehicle as in claim 4, wherein the pin hardware further includes:

a set of cotter pins constructed and arranged to insert through the set of clevis pins to retain the set of clevis pins within the set of mounting plate holes and the set of interface plate holes.

6. The firefighting robotic vehicle as in claim 3, wherein the set of mounting portions of the head assembly includes:

hook portions coupled with the head, the hook portions being constructed and arranged to align with the mounting interface of the mount assembly to enable the head assembly to engage with the mount assembly.

7. The firefighting robotic vehicle as in claim 6, wherein the set of clevis pins is constructed and arranged to extend from the mounting interface of the mount assembly to enable catching of the hook portions.

8. The firefighting robotic vehicle as in claim 7, wherein the pin hardware further includes:

a set of cotter pins constructed and arranged to insert through the set of clevis pins to retain the set of clevis pins on the mounting interface of the mount assembly.

9. The firefighting robotic vehicle as in claim 6, wherein clevis pins of the set of clevis pins are bar-shaped and constructed and arranged to catch the hook portions.

10. The firefighting robotic vehicle as in claim 9, wherein the hook portions include a pair of hooks; and wherein the set of clevis pins is constructed and arranged to extend across the pair of hooks to catch the pair of hooks.

11. The firefighting robotic vehicle as in claim 3, wherein the head includes:

a set of forklift sections constructed and arranged to transport palletized materials during firefighting robotic vehicle operation.

12. The firefighting robotic vehicle as in claim 11, wherein the head further includes:

a set of shackle members coupled with the set of forklift sections to enable the palletized materials to be restrained during transport.

13. The firefighting robotic vehicle as in claim 11, wherein the head further includes:

a plow section coupled with the set of forklift sections, the set of forklift sections being constructed and arranged to pivot between a stowed position and a deployed position relative to the plow section.

14. The firefighting robotic vehicle as in claim 2, further comprising:

a left track disposed on a left side of the vehicle body and a right track disposed on a right side of the vehicle body to enable the firefighting robotic vehicle to traverse varying terrains, the base of the frontend attachment including a plate which fastens to the underside of the vehicle body between the left track and the right track.

15. The firefighting robotic vehicle as in claim 14, wherein the frontend attachment further includes:

a set of actuators coupled with the mounting interface and with the vehicle body to move the head assembly relative to the vehicle body.

16. The firefighting robotic vehicle as in claim 1, wherein the head assembly includes:

a set of forklift sections constructed and arranged to transport palletized materials during firefighting robotic vehicle operation; and a plow section coupled with the set of forklift sections, the set of forklift sections being constructed and arranged to pivot between a stowed position and a deployed position relative to the plow section.

17. A frontend attachment for a firefighting robotic vehicle, the frontend attachment comprising:

a mount assembly constructed and arranged to attach to a vehicle body of the firefighting robotic vehicle;

a head assembly constructed and arranged to serve as a frontend of the firefighting robotic vehicle; and pin hardware constructed and arranged to selectively lock the head assembly to the mount assembly and unlock the head assembly from the mount assembly;

wherein the pin hardware includes:

a set of clevis pins constructed and arranged to insert through a set of mounting plate holes defined by a set of mounting plates of the head assembly and a set of interface plate holes defined by a set of interface plates of the mount assembly and transfer at least a portion of a load from the head assembly to the mount assembly.

18. The frontend attachment of claim 17, wherein the head assembly includes:

a set of forklift sections constructed and arranged to transport palletized materials during firefighting robotic vehicle operation; and a plow section coupled with the set of forklift sections, the set of forklift sections being constructed and arranged to pivot between a stowed position and a deployed position relative to the plow section.

19. A method of operating a firefighting robotic vehicle, the method comprising:

fastening a mount assembly to a vehicle body of the firefighting robotic vehicle;

locking a first head assembly to the mount assembly using pin hardware, the first head assembly being constructed and arranged to serve as a first frontend of the firefighting robotic vehicle; and after the first head assembly serves as the first frontend of the firefighting robotic vehicle, replacing the first head assembly with a second head assembly using the pin hardware to unlock the first head assembly from the mount assembly and then lock the second head assembly to the mount assembly;

wherein the pin hardware includes:

a set of clevis pins constructed and arranged to insert through a set of mounting plate holes defined by a set of mounting plates of the first head assembly and a set of interface plate holes defined by a set of interface plates of the mount assembly and transfer at least a portion of a load from the first head assembly to the mount assembly.

20. The method of claim 18, further comprising:

operating the first head assembly as a forklift during a first time of operation, and as a plow during a second time of operation that is different from the first time of operation.

* * * * *